US011612820B2

(12) United States Patent
Mizuguchi et al.

(10) Patent No.: US 11,612,820 B2
(45) Date of Patent: Mar. 28, 2023

(54) INFORMATION PROCESSING SYSTEM, INFORMATION PROCESSING APPARATUS, COMPUTER-READABLE STORAGE MEDIUM HAVING STORED THEREIN INFORMATION PROCESSING PROGRAM, AND INFORMATION PROCESSING METHOD

(71) Applicant: Nintendo Co., Ltd., Kyoto (JP)

(72) Inventors: Yuki Mizuguchi, Kyoto (JP); Tooru Ooe, Kyoto (JP); Shoya Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 11 days.

(21) Appl. No.: 17/201,555

(22) Filed: Mar. 15, 2021

(65) Prior Publication Data

US 2021/0197091 A1 Jul. 1, 2021

Related U.S. Application Data

(63) Continuation of application No. 14/635,457, filed on Mar. 2, 2015, now Pat. No. 10,981,068, which is a
(Continued)

(30) Foreign Application Priority Data

Feb. 25, 2011 (JP) ................. 2011-040935

(51) Int. Cl.
*A63F 13/71* (2014.01)
*A63F 13/86* (2014.01)
(Continued)

(52) U.S. Cl.
CPC ............. *A63F 13/71* (2014.09); *A63F 13/31* (2014.09); *A63F 13/327* (2014.09); *A63F 13/34* (2014.09);
(Continued)

(58) Field of Classification Search
CPC ........ A63F 13/71; A63F 13/327; A63F 13/31; A63F 13/34; A63F 13/352; A63F 13/86
See application file for complete search history.

(56) References Cited

U.S. PATENT DOCUMENTS 5,555,244 A 9/1996 Gupta et al.
6,246,684 B1 6/2001 Chapman et al.
(Continued)

FOREIGN PATENT DOCUMENTS

EP 0 336 598 A2 10/1989
JP 2003-115859 4/2003
(Continued)

OTHER PUBLICATIONS

European Search Report for EPO Application 12155328.3, dated May 22, 2013, 5 pages.
(Continued)

*Primary Examiner* — David L Lewis
*Assistant Examiner* — Robert E Mosser
(74) *Attorney, Agent, or Firm* — Nixon & Vanderhye, PC

(57) ABSTRACT

A plurality of game apparatuses function as a master, a client, and an audience. The master and the client register each other by performing therebetween an authentication process. The authentication process is not performed between the master and the audience. The audience receives a beacon from the master and registers the master in an own apparatus while the audience is not registered in the master. The master and the client execute a predetermined program, exchanging data by communicating with each other. The audience receives the data exchanged between the master and the client, and executes the predetermined program using the received data, thereby watches a game which is progressed between the master and the client, as a spectator.

27 Claims, 20 Drawing Sheets

Related U.S. Application Data continuation of application No. 13/369,653, filed on Feb. 9, 2012, now Pat. No. 8,989,666.

(51) Int. Cl.
| | | |
|---|---|---|
| *A63F 13/34* | (2014.01) | |
| *A63F 13/31* | (2014.01) | |
| *A63F 13/352* | (2014.01) | |
| *A63F 13/327* | (2014.01) | |

(52) U.S. Cl.
CPC ............ *A63F 13/352* (2014.09); *A63F 13/86* (2014.09); *A63F 2300/401* (2013.01); *A63F 2300/402* (2013.01); *A63F 2300/405* (2013.01); *A63F 2300/408* (2013.01); *A63F 2300/532* (2013.01); *A63F 2300/577* (2013.01)

(56) References Cited

U.S. PATENT DOCUMENTS

| | | |
|---|---|---|
| 7,403,542 B1 | 7/2008 | Thompson |
| 9,262,364 B2 | 2/2016 | Okajima |
| 9,832,771 B2 | 11/2017 | Okajima |
| 2003/0026252 A1 | 2/2003 | Thunquest et al. |
| 2003/0035167 A1 | 2/2003 | Hill |
| 2007/0030937 A1 | 2/2007 | Yajima et al. |
| 2007/0117635 A1 | 5/2007 | Spanton et al. |
| 2007/0165670 A1 | 7/2007 | Nagai et al. |
| 2008/0119286 A1 | 5/2008 | Brunstetter et al. |
| 2008/0219262 A1 | 9/2008 | Roay |
| 2010/0027522 A1 | 2/2010 | Mukai et al. |
| 2010/0251254 A1 | 9/2010 | Nishiguchi et al. |
| 2012/0076072 A1 | 3/2012 | Jalfon |
| 2012/0151069 A1 | 6/2012 | Eller et al. |
| 2012/0163235 A1 | 6/2012 | Ho |
| 2012/0220241 A1 | 8/2012 | Mizuguchi et al. |
| 2012/0230317 A1 | 9/2012 | Kim |

FOREIGN PATENT DOCUMENTS

| | | |
|---|---|---|
| JP | 2003-256246 | 9/2003 |
| JP | 2005-182116 | 7/2005 |
| JP | 2007-325630 A | 12/2007 |
| JP | 2008-148927 | 7/2008 |
| JP | 2009-218652 | 9/2009 |
| JP | 2010-28577 | 2/2010 |
| WO | WO 01/75545 A2 | 10/2001 |
| WO | WO 2004/109981 | 12/2004 |

OTHER PUBLICATIONS

Extended European Search Report dated Jul. 6, 2016 issued for the corresponding European Patent Application No. 12155334.1.

FIG. 6

| MAC ADDRESS | USER NAME | ID |
|---|---|---|
| MC1 | CLIENT C1 | 1 |
| MC2 | CLIENT C2 | 2 |
| | | |
| | | |
| | | |

FIG. 7

MEMORY MAP

| COMMUNICATION PROGRAM | 71 |
| MODE DATA | 72 |
| IDENTIFICATION INFORMATION (MASTER'S MAC ADDRESS) | 73 |

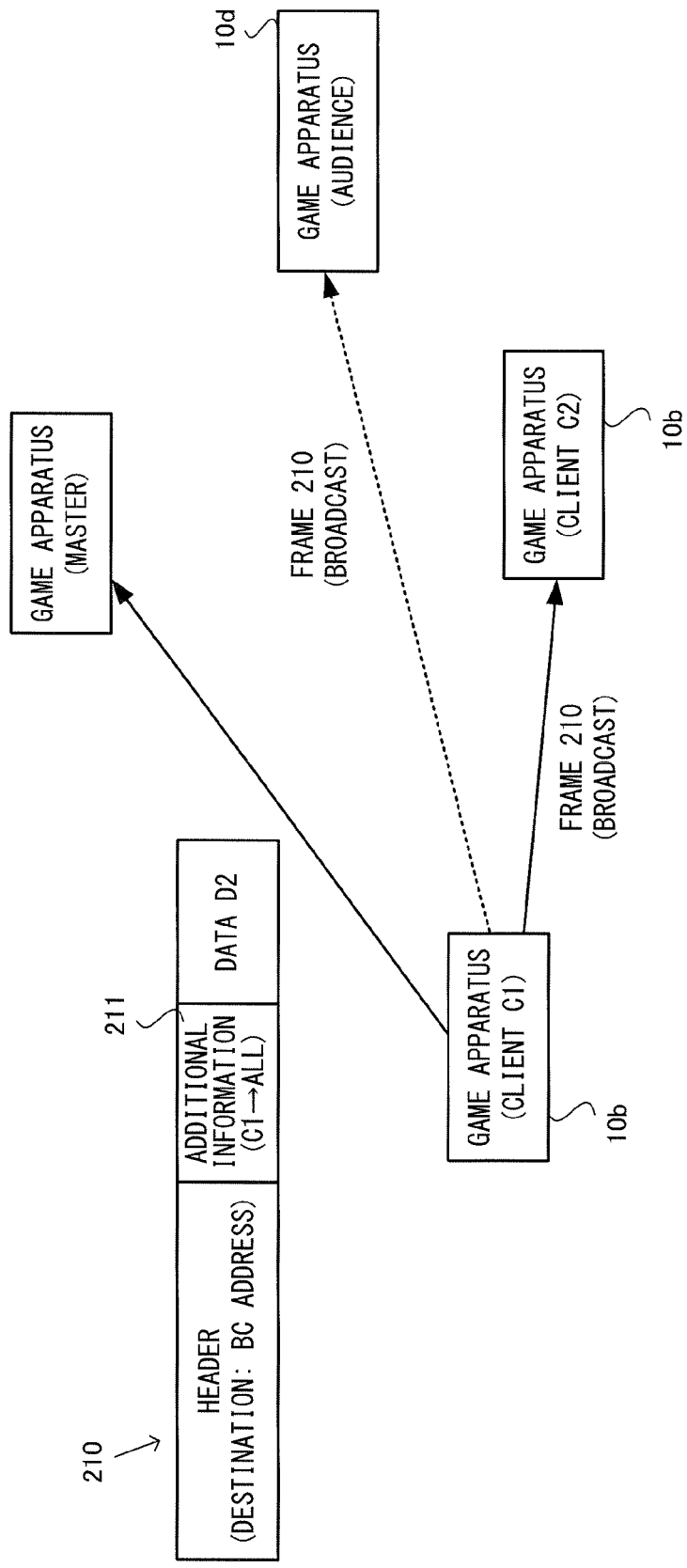

INFORMATION PROCESSING SYSTEM, INFORMATION PROCESSING APPARATUS, COMPUTER-READABLE STORAGE MEDIUM HAVING STORED THEREIN INFORMATION PROCESSING PROGRAM, AND INFORMATION PROCESSING METHOD

CROSS REFERENCE TO RELATED APPLICATIONS

This application is a continuation of U.S. patent application Ser. No. 14/635,457 filed Mar. 2, 2015, now allowed, which is a continuation of U.S. patent application Ser. No. 13/369,653 filed Feb. 9, 2012, now U.S. Pat. No. 8,989,666 issued on Mar. 24, 2015, which claims priority to of Japanese Patent Application No. 2011-040935, filed on Feb. 25, 2011. The disclosures of U.S. patent application Ser. Nos. 14/635,457, 13/369,653 and the disclosure of Japanese Patent Application No. 2011-040935 are incorporated herein by reference in their entireties.

FIELD

Techniques described herein relate to an information processing system in which a plurality of information processing apparatuses are connected to one another and across which a same application is executed, an information processing apparatus included in the information processing system, a computer-readable storage medium having stored therein an information processing program, and an information processing method.

BACKGROUND AND SUMMARY

Conventionally, there has been a plurality of information processing apparatuses which are connected to one another and execute a common program among the plurality of apparatuses. For example, there is a conventional game apparatus which has two wireless communication functions, and executes a common game program by connecting to another game apparatus, thereby playing a game. Specifically, for example, two game apparatuses are connected to each other and can play a competitive game, and also another game apparatus can be operated so as to watch the competitive game performed between the two game apparatuses as a spectator in a spectator mode. More specifically, a game apparatus first transmits a communications connection request to another game apparatus to establish a communication by a specified low power radio, and thereafter a predetermined operation is performed and the game apparatus operates in the spectator mode.

In the above-described conventional game apparatus, however, in order to be operated in the spectator mode, a connection request is transmitted to a game apparatus at the connection end to establish communications with the game apparatus at the connection end. In this case, the game apparatus at the connection end is required to register and manage the game apparatus that operates in the spectator mode. Because of this, if there is a large number of game apparatuses that are in the spectator mode, a load on the game apparatus at the connection end increases, or the number of game apparatuses allowed to watch the game may be limited.

An object of one exemplary embodiment is to provide an information processing system which can reduce the management load on an apparatus when a plurality of apparatuses communicate one another and executes a common application, an information processing apparatus, an information processing program, and an information processing method.

In order to achieve the object, the exemplary embodiment employs the following features.

The exemplary embodiment is an information processing system a plurality of information processing apparatuses each having an operation unit and communication functionality and being able to execute a predetermined communication application. A first information processing apparatus, a second information processing apparatus, and a third information processing apparatus are included in the information processing system. The first information processing apparatus includes a management frame transmission unit, a first co-registration unit, a first data reception unit, a first execution unit, and a first transmission unit. The management frame transmission unit transmits a management frame which includes first identification information. The first co-registration unit receives a registration frame transmitted from the second information processing apparatus and registers the second information processing apparatus as an inter-communication partner in an own apparatus by registering, in the own apparatus, second identification information whereby the second information processing apparatus is identified based on the received registration frame. The first data reception unit receives data transmitted from the second information processing apparatus indicated by the second identification information registered in the own apparatus by the first co-registration unit. The first execution unit executes the communication application using the data received by the first data reception unit. The first transmission unit transmits, together with the first identification information, first data based on an operation performed by the operation unit of the first information processing apparatus. The second information processing apparatus includes a management frame reception unit, a second co-registration unit, a second data reception unit, a second execution unit, and a second transmission unit. The management frame reception unit receives the management frame. The second co-registration unit transmits the registration frame which includes the second identification information to the first information processing apparatus in response to the management frame reception unit having received the management frame, so that the second identification information is registered in the first information processing apparatus, and registers the first information processing apparatus as an inter-communication partner in an own apparatus by registering, in the own apparatus, the first identification information included in the management frame transmitted from the first information processing apparatus. The second data reception unit receives the data transmitted from the first information processing apparatus indicated by the first identification information registered in the own apparatus by the second co-registration unit. The second execution unit executes the communication application using the data received by the second data reception unit. The second transmission unit transmits, together with the first identification information, second data based on an operation performed by the operation unit of the second information processing apparatus. The third information processing apparatus includes a third registration unit, a third data reception unit, and a third execution unit. The third registration unit unilaterally registers the first information processing apparatus in an own apparatus by registering, in the own apparatus, the first identification information included in the management frame transmitted from the first information processing apparatus, without transmitting a registration frame for registering identification information of the own apparatus in the first information processing apparatus. The third data reception unit receives, based on the first identification information unilaterally registered in the own apparatus by the third registration unit, the first data transmitted from the first information processing apparatus and the second data transmitted from the second information processing apparatus. The third execution unit executes the communication application using the data received by the third data reception unit. The first execution unit and the second execution unit execute the communication application using the operation performed by the operation unit of the first information processing apparatus and the operation performed by the operation unit of the second information processing apparatus, respectively, by executing the communication application using the data received by the first data reception unit and the data received by the second data reception unit, respectively. The third execution unit presents a running state of the communication application executed using the operation performed by the operation unit of the first information processing apparatus and the operation performed by the operation unit of the second information processing apparatus, by executing the communication application using the data received by the third data reception unit.

According to the above configuration, the first information processing apparatus and the second information processing apparatus register the identification information in the own apparatuses and perform data transmission/reception therebetween. On the other hand, the third information processing apparatus unilaterally registers the first information processing apparatus in the own apparatus and the third information processing apparatus is not registered in the first information processing apparatus. Therefore, the third information processing apparatus can execute an application according to operations performed in the first information processing apparatus and the second information processing apparatus, without being registered in the first information processing apparatus.

In another configuration, the first information processing apparatus may be able to receive a search frame for searching, which is transmitted from another information processing apparatus, and transmit a search response frame indicating a response to the search frame. The third information processing apparatus includes a search frame transmission unit for including third data in the search frame and transmitting the search frame to the first information processing apparatus. The first execution unit of the first information processing apparatus executes the communication application using the third data included in the search frame transmitted from the third information processing apparatus.

According to the above configuration, the third information processing apparatus can include the third data in the search frame and transmit the search frame to the first information processing apparatus. The first information processing apparatus can then execute the application using the third data.

In another configuration, the third data may be data based on an operation performed by the operation unit of the third information processing apparatus. The first execution unit of the first information processing apparatus executes the communication application using the third data.

According to the above configuration, the first information processing apparatus can reflect the operation, performed by the operation unit of the third information processing apparatus, on the execution result of the communication application by receiving the third data and executing the communication application.

In another configuration, the first transmission unit of the first information processing apparatus may further transmit the third data included in the search frame. The second data reception unit of the second information processing apparatus further receives the third data transmitted from the first information processing apparatus. The second execution unit of the second information processing apparatus executes the communication application using the third data.

According to the above configuration, the second information processing apparatus can receive the third data transmitted from the third information processing apparatus to the first information processing apparatus. This allows the second information processing apparatus to perform, for example, a process according to an operation performed in the third information processing apparatus.

In another configuration, the first transmission unit of the first information processing apparatus may include predetermined data in the search response frame and transmits the search response frame. The third data reception unit of the third information processing apparatus acquires the predetermined data by receiving the search response frame transmitted from the first information processing apparatus.

According to the above configuration, the third information processing apparatus can acquire a predetermined data from the first information processing apparatus by receiving the search response frame.

In another configuration, the first transmission unit of the first information processing apparatus may transmit the first data in either one of a broadcast fashion and a multicast fashion. The third data reception unit of the third information processing apparatus receives, based on the first identification information registered in the own apparatus, the first data transmitted from the first information processing apparatus in either one of the broadcast fashion and the multicast fashion.

According to the above configuration, the first information processing apparatus can transmit the first data in either one of the broadcast fashion and the multicast fashion, and the third information processing apparatus can receive the data.

In another configuration, information regarding one or more of the plurality of information processing apparatuses that are already registered in the first information processing apparatus may be included in the management frame.

According to the above configuration, information regarding the information processing apparatus that is already registered in the first information processing apparatus can be included in the management frame. This allows the second information processing apparatus and the third information processing apparatus to acquire the information regarding the one or more information processing apparatuses that are already registered in the first information processing apparatus.

In another configuration, the second information processing apparatus and the third information processing apparatus may perform predetermined processing using the information, included in the management frame, regarding the one or more information processing apparatuses already registered in the first information processing apparatus.

According to the above configuration, the second information processing apparatus and the third information processing apparatus can perform predetermined processes using the information regarding the already-registered information processing apparatuses. For example, the second information processing apparatus and the third information processing apparatus can display a list of the registered information processing apparatuses or, if the number of information processing apparatuses registered in the first information processing apparatus increases or decreases, the second information processing apparatus and the third information processing apparatus can display information regarding the increase/decrease.

In another configuration, executability information indicating whether to permit the third information processing apparatus to execute the communication application may be included in the management frame. The third information processing apparatus further includes an execution determination unit for determining, based on the executability information, whether to receive the first data and the second data or whether to execute the communication application.

According to the above configuration, the first information processing apparatus can, for example, permit or forbid the third information processing apparatus to execute the communication application. For example, the first information processing apparatus can forbid the third information processing apparatus to watch the communication application executed between the first information processing apparatus and the second information processing apparatus.

In another configuration, the second information processing apparatus and the third information processing apparatus may each include a selection unit for presenting, to a user, information regarding a plurality of the first information processing apparatuses and allowing the user to select one of the information regarding the plurality of first information processing apparatuses when the second information processing apparatus and the third information processing apparatus each receive the management frames from the plurality of the first information processing apparatuses. The second co-registration unit of the second information processing apparatus transmits the registration frame to the first information processing apparatus selected by the user, and registers the selected first information processing apparatus in the own apparatus. The third registration unit of the third information processing apparatus unilaterally registers the first information processing apparatus selected by the user in the own apparatus.

According to the above configuration, users of the second information processing apparatus and the third information processing apparatus can select and register one first information processing apparatus from a plurality of first information processing apparatuses.

In another configuration, the first transmission unit of the first information processing apparatus may transmit the second data received by the first data reception unit from the second information processing apparatus and the first data. The third data reception unit of the third information processing apparatus receives, based on the first identification information registered in the own apparatus, the first data and the second data transmitted from the first information processing apparatus.

According to the above configuration, the first information processing apparatus can receive the second data sent from the second information processing apparatus and transmit the data. That is, the third information processing apparatus can receive the second data from the second information processing apparatus via the first information processing apparatus. This allows the third information processing apparatus to receive data from the second information processing apparatus via the first information processing apparatus even if a distance between the second information processing apparatus and the third information processing apparatus is large.

In another configuration, the first information processing apparatus, the second information processing apparatus, and the third information processing apparatus may communicate one another, based on an IEEE 802.11 standard. The management frame transmission unit of the first information processing apparatus transmits a beacon. The management frame reception unit of the second information processing apparatus receives the beacon. The first co-registration unit of the first information processing apparatus and the second co-registration unit of the second information processing apparatus exchange, as the registration frame, an authentication frame and an association frame therebetween and register each other. The third registration unit of the third information processing apparatus unilaterally registers, in the own apparatus, the first identification information included in the beacon transmitted from the first information processing apparatus, without exchanging the authentication frame and the association frame with the first information processing apparatus.

In another configuration, the first information processing apparatus, the second information processing apparatus, and the third information processing apparatus may communicate one another, based on an IEEE 802.11 standard, and the search frame may be a probe request.

In another configuration, the search response frame may be a probe response.

According to the above configuration, the first and second and third information processing apparatuses can communicate one another, based on the IEEE 802.11 standard.

In another configuration, the first information processing apparatus may alternate between an awake state and a power-saving state at predetermined time cycles. The management frame transmission unit of the first information processing apparatus periodically transmits a management frame which includes information indicating the predetermined time cycles. The second information processing apparatus alternates between the awake state and the power-saving state in synchronization with the predetermined time cycles, based on the management frame transmitted from the first information processing apparatus indicated by the first identification information registered in the own apparatus. The third information processing apparatus alternates between the awake state and the power-saving state in synchronization with the predetermined time cycles, based on the management frame transmitted from the first information processing apparatus indicated by the first identification information registered in the own apparatus.

According to the above configuration, the second information processing apparatus and the third information processing apparatus can alternate between the awake state and the power-saving state in synchronization with the first information processing apparatus. This allows communication with reduced power consumption.

In another configuration, when the third information processing apparatus is set to be in a predetermined mode, the third information processing apparatus may set the own apparatus to be in the power-saving state, based on the first data transmitted from the first information processing apparatus. When the third information processing apparatus is set to be in the predetermined mode, the search frame transmission unit limits transmission of the search frame therefrom. Even when the third information processing apparatus is set to be in the predetermined mode, the third data reception unit receives the first data and the second data transmitted from the first information processing apparatus and the second information processing apparatus, respectively. Even when the third information processing apparatus is set to be in the predetermined mode, the third execution unit presents the running state of the communication application executed using the operation performed by the operation unit of the first information processing apparatus and the operation performed by the operation unit of the second information processing apparatus, by executing the communication application using the data received by the third data reception unit.

According to the above configuration, when the third information processing apparatus is in a predetermined mode, the third information processing apparatus can set the own apparatus to be in the power-saving state, based on the first data sent from the first information processing apparatus, and reduce the power consumption. In addition, in the predetermined mode, the transmission of the search frame can be limited in the third information processing apparatus. Even when the transmission of the search frame is limited, the third information processing apparatus still can receive data and execute the communication application.

Also, another configuration of the exemplary embodiment is an information processing system including a plurality of information processing apparatuses each having communication functionality and being able to execute a predetermined communication application. Participation information processing apparatuses and non-participation information processing apparatuses are included in the information processing system, the participation information processing apparatuses executing the communication application in a participation mode and the non-participation information processing apparatuses executing the communication application in a non-participation mode. The participation information processing apparatus includes a co-registration unit and a first execution unit. The co-registration unit registers each other's identification information with at least one other participation information processing apparatus after a predetermined authentication process therebetween. The first execution unit transmits predetermined data together with own identification information, executes the communication application in the participation mode using data transmitted from the information processing apparatus indicated by the identification information registered by the co-registration unit, and presents a result of executing the communication application. The non-participation information processing apparatus includes a unilateral-registration unit and a second execution unit. The unilateral-registration unit unilaterally registers, in an own apparatus, the identification information of at least one of the participation information processing apparatuses, without performing the authentication process with the participation information processing apparatus. The second execution unit presents a running state of the communication application executed in the participation mode, using the data transmitted from the participation information processing apparatus indicated by the identification information registered by the unilateral-registration unit.

According to the above configuration, the participation information processing apparatus performs the authentication process with other participation information processing apparatus and register each other's identification information in the own apparatuses. The non-participation information processing apparatus unilaterally registers, in the own apparatus, the identification information of at least one of the participation information processing apparatuses, without performing the authentication process with the participation information processing apparatus. The non-participation information processing apparatus executes the communication application using the data from the participation information processing apparatus registered in the own apparatus. This allows the non-participation information processing apparatus to execute the communication application using the data transmitted from the participation information processing apparatus, without the identification information of the non-participation information processing apparatus being registered in the participation information processing apparatus.

Also, another exemplary embodiment may be an information processing method executed in an information processing system.

Another configuration of the exemplary embodiment is an information processing apparatus for performing processing based on an operation performed by a first information processing apparatus and an operation performed by a second information processing apparatus, the first information processing apparatus and the second information processing apparatus each having communication functionality and an operation unit and being able to execute a predetermined communication application. The first information processing apparatus transmits a management frame which includes first identification information, receives a registration frame transmitted from the second information processing apparatus, and registers, in an own apparatus, second identification information whereby the second information processing apparatus is identified based on the received registration frame. By receiving data transmitted from the second information processing apparatus indicated by the second identification information registered in the own apparatus and executing the communication application using the data, the first information processing apparatus presents a result of executing the communication application which is progressed based on the operation performed by the operation unit of the first information processing apparatus and the operation performed by the operation unit of the second information processing apparatus, and transmits, together with the first identification information, first data based on the operation performed by the operation unit of the first information processing apparatus. The second information processing apparatus transmits the registration frame which includes the second identification information to the first information processing apparatus in response to having received the management frame, so that the second identification information is registered in the first information processing apparatus, and registers, in an own apparatus, the first identification information included in the management frame transmitted from the first information processing apparatus. By receiving the data transmitted from the first information processing apparatus indicated by the first identification information registered in the own apparatus and executing the communication application using the data, the second information processing apparatus presents a result of executing the communication application which is progressed based on the operation performed by the operation unit of the first information processing apparatus and the operation performed by the operation unit of the second information processing apparatus, and transmits, together with the first identification information, second data based on the operation performed by the operation unit of the second information processing apparatus. In this case, the information processing apparatus includes a registration unit, a data reception unit, and an execution unit. The registration unit unilaterally registers in the own apparatus the first information processing apparatus by registering, in the own apparatus, the first identification information included in the management frame transmitted from the first information processing apparatus, without transmitting a registration frame for registering the identification information of the own apparatus in the first information processing apparatus. The data reception unit receives, based on the first identification information unilaterally registered in the own apparatus by the registration unit, the first data transmitted from the first information processing apparatus and the second data transmitted from the second information processing apparatus. The execution unit presents a result of executing the communication application which is progressed based on the operation performed by the operation unit of the first information processing apparatus and the operation performed by the operation unit of the second information processing apparatus, by executing the communication application using the data received by the data reception unit.

According to the above configuration, the information processing apparatus can receive data transmitted/received between the first information processing apparatus and the second information processing apparatus, and execute the communication application using the data without awareness of the first information processing apparatus and the second information processing apparatus.

In another configuration, the exemplary embodiment may be an information processing program executed in the information processing apparatus.

According to one exemplary embodiment, management load applied on a plurality of apparatuses, when the plurality of apparatuses perform communications therebetween and execute a common application, can be reduced.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 6 is a diagram showing an example of a non-limiting registration table 80 of clients generated in a master;

FIG. 7 is a diagram showing a memory map of the memory (such as an example of a non-limiting main memory 32 or memory in an example of a non-limiting wireless communication module 36) of each non-limiting game apparatus 10;

FIG. 23 is a diagram showing how the non-limiting client C1 directly transmits data to all terminals.

DETAILED DESCRIPTION OF NON-LIMITING EXAMPLE EMBODIMENTS (Structure of Game Apparatus)

Figure 1:
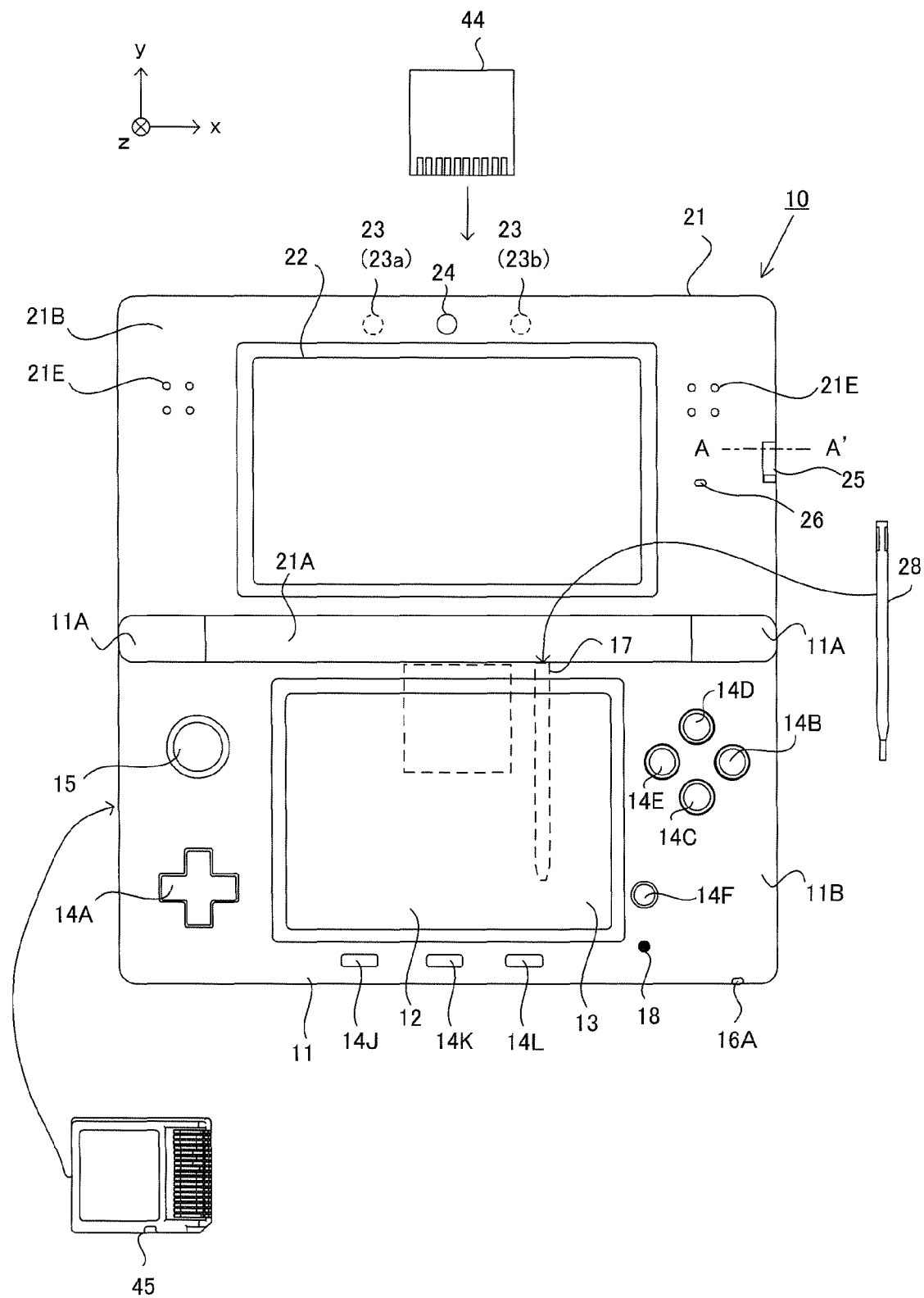
FIG. 1 is a front view of an example of a non-limiting game apparatus 10 in an open state.
Figure 2:
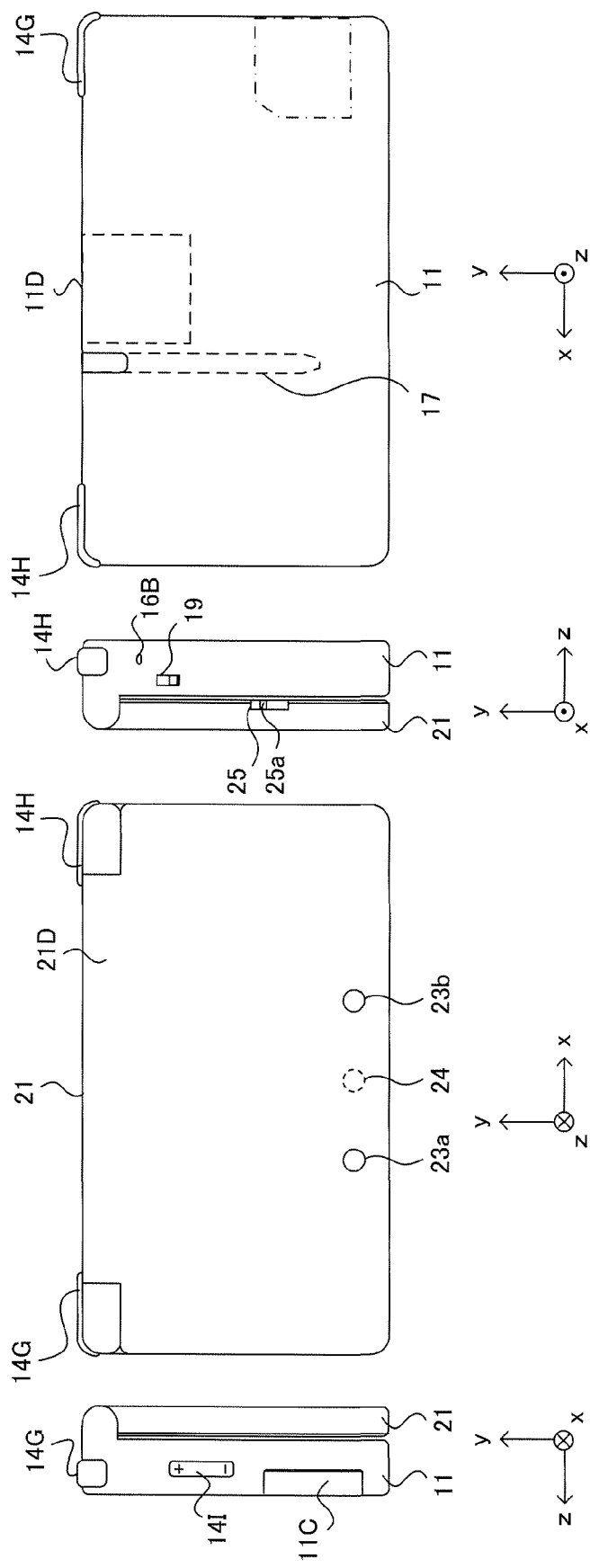
FIG. 2A is a left side view of the non-limiting game apparatus 10 in a closed state.
FIG. 2B is a front view of the non-limiting game apparatus 10 in the closed state.
FIG. 2C is a right side view of the non-limiting game apparatus 10 in the closed state.
FIG. 2D is a rear view of the non-limiting game apparatus 10 in the closed state.

Hereinafter, a game apparatus according to one exemplary embodiment will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIG. 1 to FIG. 2D. FIG. 1 shows the game apparatus 10 in the opened state and FIG. 2A to 2D each show the game apparatus 10 in the closed state. The game apparatus 10 is able to take an image by an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 2D. The game apparatus 10 includes a lower housing 11 and an upper housing 21 as shown in FIG. 1 to FIG. 2D. The lower housing 11 and the upper housing 21 are connected to each other so as to be openable and closable (foldable).

(Description of Lower Housing)

Initially, a structure of the lower housing 11 will be described. As shown in FIG. 1 to FIG. 2D, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the present embodiment, any other display device such as a display device using an EL (Electro Luminescence) or the like, may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A has a cross shape, and includes buttons for indicating an upward, a downward, a leftward, or a rightward direction. The buttons 14A to 14E, the selection button 14J, the HOME button 14K, and the start button 14L are assigned functions, respectively, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIG. 2B and FIG. 2D, an L button 14G and an R button 14H are provided on the upper side surface of the lower housing 11. The L button 14G and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication functionality is enabled. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using, for example, an EL (Electro Luminescence), or the like may be used. In addition, a display device having any resolution may be used as the upper LCD 22.

The upper LCD 22 is a display device capable of displaying a stereoscopically visible image. Further, in the present embodiment, a left-eye image and a right-eye image are displayed by using substantially the same display area. Specifically, the upper LCD 22 is a display device using a method in which the left-eye image and the right-eye image are alternately displayed in the horizontal direction in predetermined units (for example, every other line). Alternatively, the upper LCD 22 may be a display device using a method in which the left-eye image and the right-eye image are alternately displayed for a predetermined time period and the left-eye image and the right-eye image are viewed by the user's left eye and the right eye, respectively, by using glasses. In the present embodiment, the upper LCD 22 is a display device capable of displaying an image which is stereoscopically visible by the naked eye, and a lenticular lens type display device or a parallax barrier type display device is used which enables the left-eye image and the right eye image, which are alternately displayed in the horizontal direction, to be separately viewed by the left eye and right eye, respectively. In the present embodiment, the upper LCD 22 of a parallax barrier type is used. The upper LCD 22 displays, by using the right-eye image and the left eye image, an image (a stereoscopic image) which is stereoscopically visible by the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of shift of the right-eye image and the left-eye image in the horizontal direction is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound from a speaker 43 described below is outputted through the speaker hole 21E.

(Internal Configuration of Game Apparatus 10)

Figure 3:
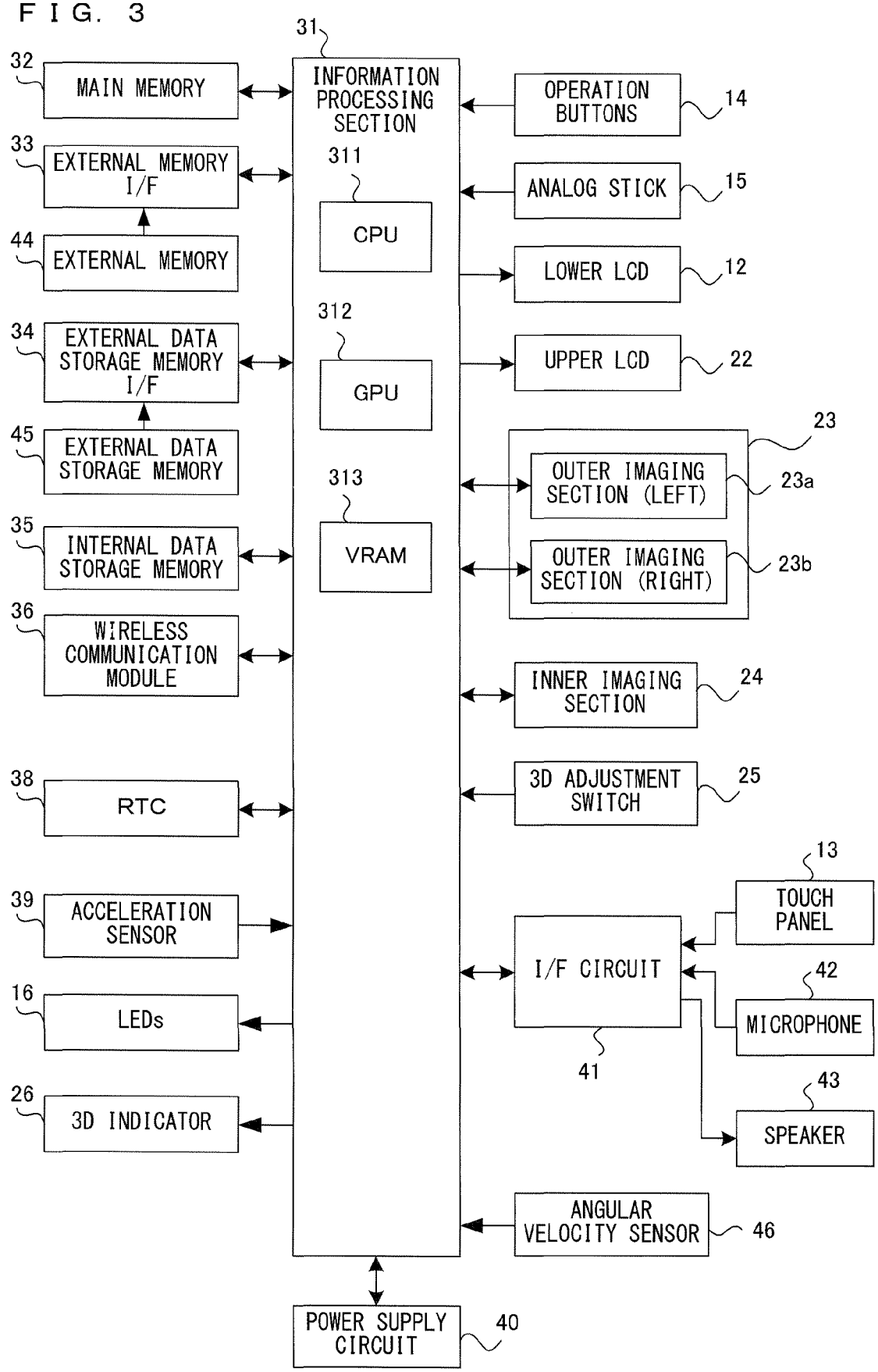
FIG. 3 is a block diagram showing an internal configuration of the non-limiting game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a real-time clock (RTC) 38, an acceleration sensor 39, a power supply circuit 40, an interface circuit (I/F circuit) 41. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The wireless communication module 36 is connected to the information processing section 31. The information processing section 31 can perform data transmission to and data reception from another device via the Internet by using the wireless communication module 36. The wireless communication module 36 may support unique communication methods other than the IEEE 802.11.b/g standard.

The acceleration sensor 39 is connected to the information processing section 31. The acceleration sensor 39 detects magnitudes of accelerations (linear accelerations) in directions of straight lines along three axial (xyz axial) directions, respectively. The acceleration sensor 39 is provided inside the lower housing 11. In the acceleration sensor 39, as shown in FIG. 1, the long side direction of the lower housing 11 is defined as the x axial direction, the short side direction of the lower housing 11 is defined as the y axial direction, and the direction orthogonal to the inner side surface (main surface) of the lower housing 11 is defined as the z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position on which an input is made on an input surface of the touch panel 13. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Outline of Communication Process)

Next, an outline of a communication process according to one exemplary embodiment will be described with reference to the accompanying drawings. The game apparatus 10 is communicable with another game apparatus by the wireless communication module 36, by using a method based on, for example, the IEEE 802.11.b/g standard. In the exemplary embodiment, a game is progressed by a plurality of game apparatuses 10 being connected to one another by a method based in part on the IEEE 802.11.b/g standard.

Figure 4:
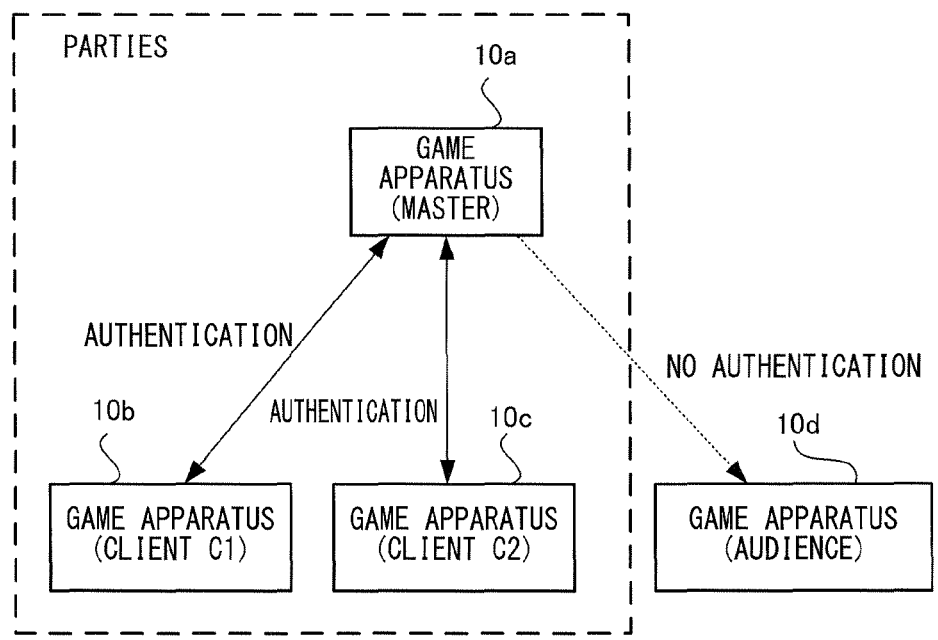
FIG. 4 is a diagram showing a network including a plurality of non-limiting game apparatuses 10 when a game according to the exemplary embodiment is executed.

FIG. 4 is a diagram showing a network including a plurality of game apparatuses 10 when a game according to the exemplary embodiment is executed. As shown in FIG. 4, in the exemplary embodiment, among the plurality of game apparatuses 10, a game apparatus 10a functions as a master, and a game apparatus 10b and a game apparatus 10c function as a client C1 and a client C2, respectively, (the game apparatus 10a, 10b, and 10c operate in a participation mode). In the exemplary embodiment, a game apparatus 10d functions as an audience (spectator) different from the master, the client C1, and the client C2 (the game apparatus 10d operates in a non-participation mode). The audience only watches, as a spectator, the game being progressed between the master and the clients. The number of game apparatuses 10 allowed for participating in the game as clients is set, for example, up to 15. The number of game apparatuses 10 allowed for watching the game as an audience is not limited.

Figure 5:
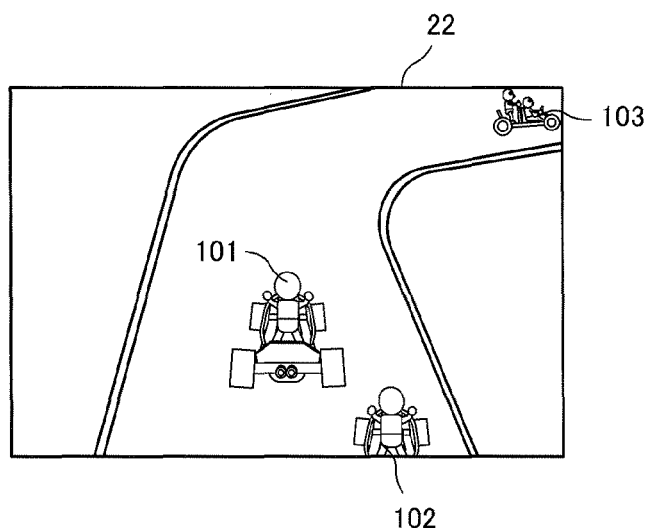
FIG. 5 is a diagram showing an example of an image displayed on an example of a non-limiting upper LCD 22 of the game apparatus when the game according to the exemplary embodiment is executed.

FIG. 5 is a diagram showing an example of an image displayed on the upper LCD 22 of the game apparatus when the game according to the exemplary embodiment is executed. As shown in FIG. 5, for example, a plurality of game characters is displayed on the upper LCDs 22 of the game apparatuses 10a to 10d, and a race game is performed in which the plurality of game characters drives carts over a course. Specifically, a game character 101 operated by a user of the master (the game apparatus 10a), a game character 102 operated by a user of the client C1 (the game apparatus 10b), and a game character 103 operated by a user of the client C2 (the game apparatus 10c) are displayed on the upper LCDs 22 of the game apparatuses 10a to 10c. The image shown in FIG. 5 is also displayed on the upper LCD 22 of the audience (the game apparatus 10d). The audience does not participate in the race game as a player, but is allowed to watch the race game, participating as a spectator of the race game being progressed between the game apparatuses 10a, 10b, and 10c. Different images may be displayed on the game apparatuses 10, and, for example, images having different points of view may be displayed on the respective game apparatuses 10. For example, an image centered on the game character 101 operated in the master may be displayed on a screen of the master, and an image centered on the game character 102 operated in the client C1 may be displayed on a screen of the client C1. On a screen of the audience, an image having a different point of view from those of the master and clients may be displayed. In addition, information (for example, a course map image, numbers, characters, and the like) whereby the game status is recognizable may be displayed on the screen of the audience, instead of an image of a virtual space.

As shown in FIG. 4, an authentication is first performed between the master (the game apparatus 10a) and the client C1 (the game apparatus 10b). Likewise, an authentication is performed between the master (the game apparatus 10a) and the client C2 (the game apparatus 10c). After the authentication between the master and clients C, the master registers, in the own apparatus, identification information (MAC addresses) of the clients C authenticated by the master, and transmits/receives operation data (for example, operation data regarding the operation buttons 14, and the like) and the like to/from the registered clients C. Likewise, after the authentication with the master, the clients register, in the own apparatuses, identification information (MAC address) of the master. This allows progression of the game while the master and the clients C exchanging data therebetween. On the other hand, no authentication is performed between the master (the game apparatus 10a) and the audience (the game apparatus 10d), and identification information (MAC address) of the audience is not registered in the master. The audience registers, in the own apparatus, the identification information (MAC address) of the master. The audience only receives data transmitted from the master and the clients C, generates a game image, based on the data transmitted from the master and the clients C, and displays the game image on the upper LCD 22 of the own apparatus. Since no communication for authentication is performed between the master and the audience, the audience is not recognizable to the master and the clients C.

FIG. 6 is a diagram showing a registration table 80 of clients which is generated in the master. As shown in FIG. 6, a MAC address, user name, and ID of the authenticated client are stored in the master. The user name is a name assigned by a user of each game apparatus. The ID is a number assigned to each client upon the registration of the client in the master, and is, for example, an integer between 1 through 15. The master registers, for example, up to 15 authenticated clients in the table shown in FIG. 6. On the other hand, the audience is not registered in the registration table 80 of the master.

In each game apparatus, a setting process is performed prior to the execution of the game. Performing the setting process determines whether the game apparatus operates as the master, the client, or the audience. In the exemplary embodiment, the user of each game apparatus 10 selects whether the game apparatus of the own operates as the master, the client, or the audience.

(Setting Process)

Next, the setting process performed in the game apparatus 10 will be described. FIG. 7 is a diagram showing a memory map of a memory (such as the main memory 32 or memory in the wireless communication module 36) of each game apparatus 10.

As shown in FIG. 7, a communication program 71, mode data 72, and identification information 73 are stored in the memory of the game apparatus 10. The communication program 71 includes a program for controlling the communication and a game program. Specifically, the communication program 71 is a program for executing each of below-described processes (the setting process, a master process, a client process, an audience process, a data transmission process, and a data reception process). The mode data 72 is data representing whether the game apparatus 10 is operated in a mode between as the master, the client, and the audience. The identification information 73 is identification information whereby the master to which the own apparatus is connected is identified, and specifically, the identification information 73 is the MAC address of the master. If the game apparatus 10 functions as the master, the MAC address of the own apparatus is stored in the identification information 73. In addition to the data shown in FIG. 7, various data is stored in the memory of each game apparatus 10 according to the mode. For example, data representing the registration table 80 shown in FIG. 6 and the like is stored in the master. An outbox 110 for individual which is an area storing individual-transmission data described below and an outbox 120 for all which is an area storing universal-transmission data are provided in the memories of the master and the client. For example, various data for use in a game process are stored in each game apparatus.

Figure 8:
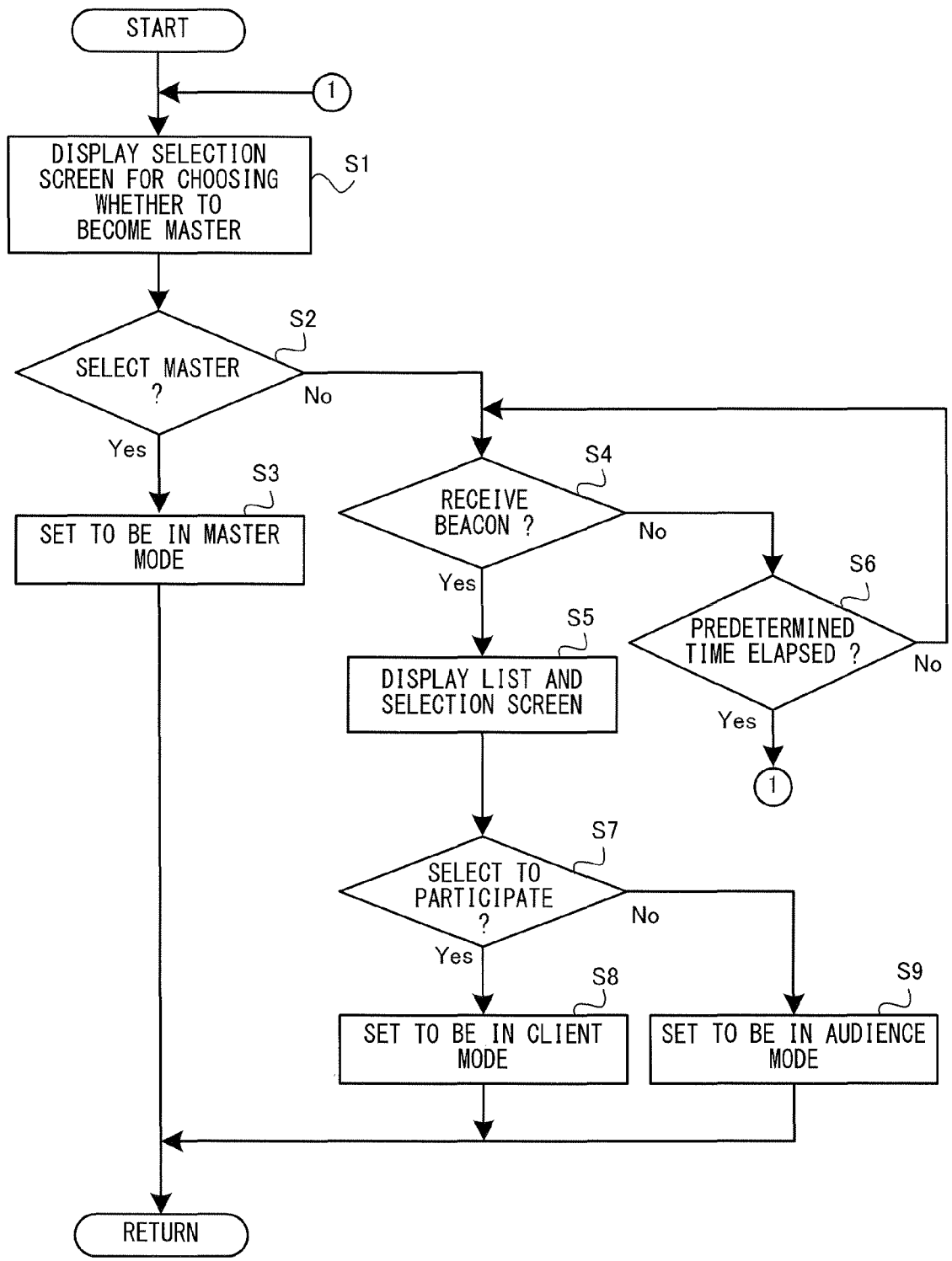
FIG. 8 is a flowchart illustrating a flow of a setting process executed in each non-limiting game apparatus 10.

FIG. 8 is a flowchart illustrating a flow of the setting process executed in each game apparatus 10. When the game apparatus 10 is powered on, an information processing section 31 (CPU 311) of the game apparatus 10 executes a boot program stored in a ROM (not shown) to initialize each unit, such as the main memory 32. Next, the program stored in the ROM is loaded into a memory (specifically, the main memory 32), and the CPU 311 of the information processing section 31 starts executing the program. The process illustrated in the flowchart shown in FIG. 8 is performed by the information processing section 31 after completion of the above process.

First, in step S1, the information processing section 31 displays a selection screen on the upper LCD 22 or the lower LCD 12 for allowing the user to choose whether to become the master. For example, on the lower LCD 12, an icon for allowing the user to select whether to cause the own apparatus to function as the master is displayed. Next, the information processing section 31 executes a process of step S2.

In step S2, the information processing section 31 determines whether the master has been selected. For example, the information processing section 31 determines whether the icon for selecting the master has been touched, based on a touch position detected by the touch panel 13. If the master has been selected, the information processing section 31 next executes a process of step S3. On the other hand, if the master is not selected, the information processing section 31 next executes a process of step S4.

In step S3, the information processing section 31 sets the own apparatus to be in a master mode. Specifically, the information processing section 31 stores a value indicating that the own apparatus is the master in the mode data 72, and sets the MAC address of the own apparatus to the identification information 73. The information processing section 31 next ends the setting process shown in FIG. 8.

In step S4, the information processing section 31, on the other hand, determines whether a beacon has been received. Here, the beacon is a management frame which is periodically (for example, every 100 msec.) transmitted by the master in a broadcast fashion. If a game apparatus 10 functioning as the master is near the own apparatus, the information processing section 31 receives the beacon periodically transmitted by the master.

Figure 9:
FIG. 9 is a diagram showing a frame format of a beacon periodically transmitted by the master.

FIG. 9 is a diagram showing a frame format of the beacon periodically transmitted by the master. As shown in FIG. 9, the beacon includes a source address (the MAC address of the master), a BSSID (matching the MAC address of the master), a game ID, the number of connections, the maximum number of connections, a connected list, and a spectating permission flag. The source address and the BSSID are embedded in the header portion of the frame. The game ID, the number of connections, the maximum number of connections, the connected list, and the spectating permission flag are data included, in the body portion of the frame, as information elements unique to vendor. The game ID is an ID whereby a game executed in each game apparatus 10 is identified. The number of connections is the number of clients currently resisted in the registration table 80 (authenticated clients) of the master. The maximum number of connections is the maximum number of connections (15) of clients allowed by the master plus the master, and is set, for example, to 16. The connected list is a list of information indicating clients currently registered in the master (clients registered in the registration table 80), and is, for example, a list of user names of the registered clients. The spectating permission flag is information indicating whether to permit the audience to watch the game as a spectator.

In step S4, if the information processing section 31 has received the beacon, the information processing section 31 next executes a process of step S5. If, on the other hand, the information processing section 31 has not received the beacon, the information processing section 31 next executes a process of step S6.

Figure 10:
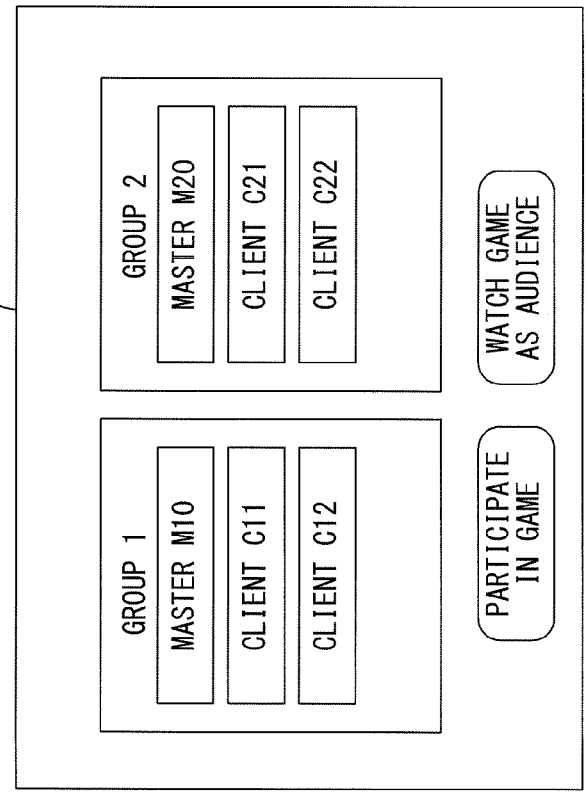
FIG. 10 is a diagram showing an example of an image displayed on a screen in step S5.

In step S5, the information processing section 31 displays a list of the master and the clients, and a selection screen. Here, the information processing section 31 displays the list of clients currently registered in the master on the upper LCD 22 or the lower LCD 12, based on the connected list included in the beacon received in step S4. For example, when the game apparatus 10a shown in FIG. 4 functions as the master and the game apparatus 10c is registered as a client in the master, the information processing section 31 displays icons indicating the game apparatus 10a and the game apparatus 10c on the lower LCD 12. In step S4, if the information processing section 31 receives a plurality of beacons from different sources (i.e., if there is a plurality of game apparatuses 10 functioning as the masters near the own apparatus), the information processing section 31 displays each of the masters and clients registered in the master. As a result, the user selects a master to connect to (a network, formed by which master to connect to). Also, the information processing section 31 displays, on the upper LCD 22 or the lower LCD 12, icons for allowing the user to select whether to cause the own apparatus to operate as a client or an audience. For example, on the lower LCD 12, an icon indicating participation in the game, and an icon indicating watching the game as a spectator are displayed, and the user is allowed to select either one of the icons. FIG. 10 is a diagram showing an example of an image displayed on the screen in step S5. As shown in FIG. 10, if two masters, which are a master M10 and a master M20, are detected to be near the own apparatus (i.e., if the information processing section 31 receives beacons from two different terminals), for example, a list for each group (the network) including each master is displayed on the screen of the lower LCD 12. For example, a group 1 which includes the master M10, a client C11, and a client C12, and a group 2 which includes the master M20, a client C21, and a client C22 are displayed. For example, the user selects one of the displayed groups. The user then selects, with respect to the selected group, whether to participate in the game (cause the own apparatus to operate as a client) or watch the game as a spectator (cause the own apparatus to operate as an audience). The information processing section 31 next executes a process of step S7.

In step S6, the information processing section 31, on the other hand, determines whether a predetermined time has elapsed. If the predetermined time has elapsed, which means that no game apparatus 10 functioning as the master is found near the own apparatus, the information processing section 31 re-executes the process of step S1. On the other hand, if the predetermined time has not elapsed, the information processing section 31 re-executes the process of step S4.

In step S7, the information processing section 31 determines whether the icon indicating the participation in the game has been selected. Specifically, the information processing section 31 determines whether the icon indicating the participation in the game (i.e., an icon for indicating causing the own apparatus to operate as a client) has been selected, based on a touch position detected by the touch panel 13. If the determination result is affirmative, the information processing section 31 next executes a process of step S8. If the determination result is negative, the information processing section 31 next executes a process of step S9.

In step S8, the information processing section 31 sets the own apparatus to be in a client mode. Specifically, the information processing section 31 stores a value representing that the own apparatus is a client in the mode data 72. The information processing section 31 thereafter ends the setting process shown in FIG. 8.

In step S9, the information processing section 31 sets the own apparatus to be in an audience mode. Specifically, the information processing section 31 stores a value representing that the own apparatus is an audience in the mode data 72. The information processing section 31 thereafter ends the setting process shown in FIG. 8.

As described above, each game apparatus 10 is set to be in either the master mode, the client mode, or the audience mode. After the mode of each game apparatus is set in this manner, the game apparatuses execute different processes, according to the modes set thereto.

(Master Process)

Figure 11:
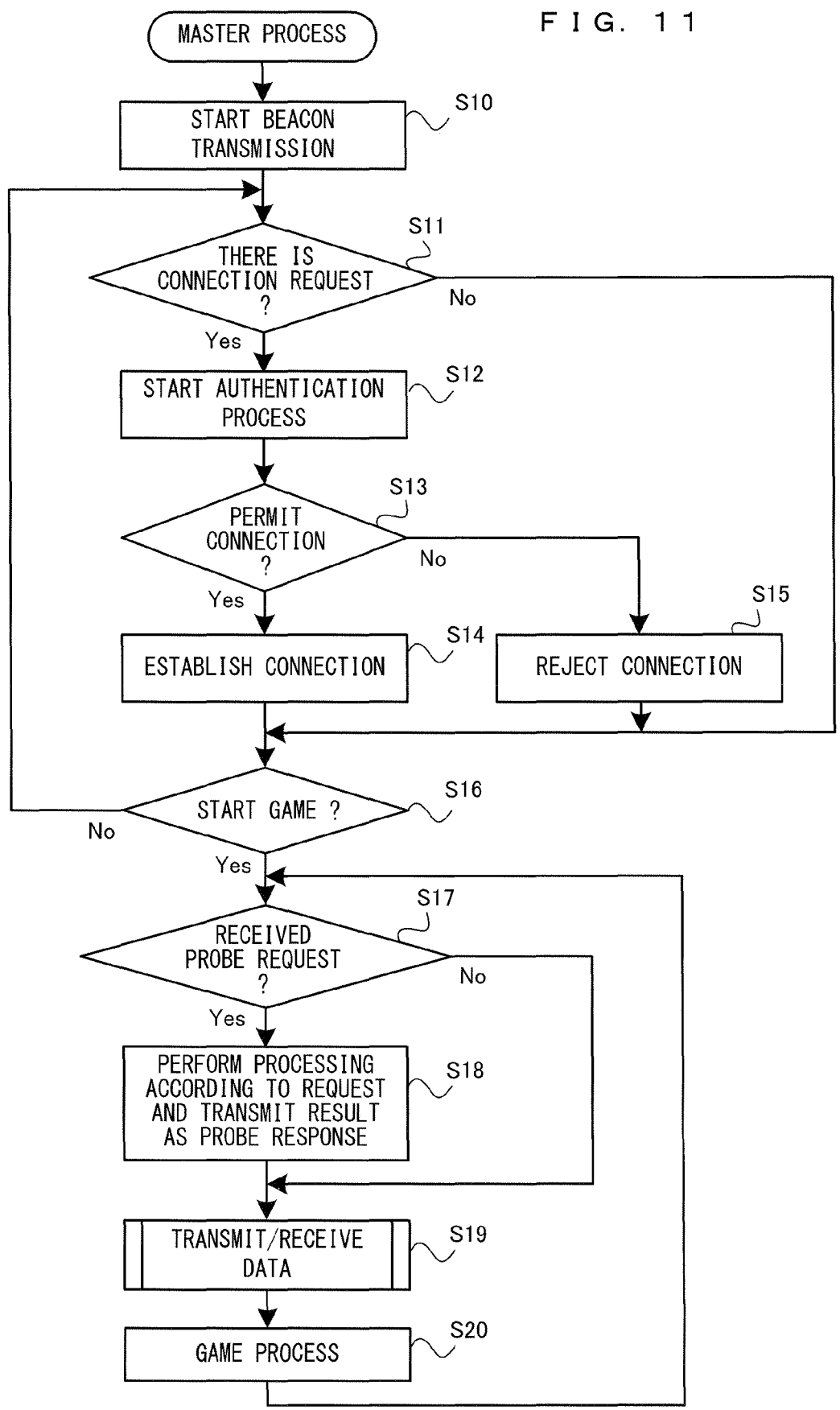
FIG. 11 is a flowchart illustrating details of a process (master process) of the non-limiting game apparatus 10 functioning as a master.

Next, a process performed in the master will be described in detail. FIG. 11 is a flowchart illustrating details of the process (the master process) performed by the game apparatus 10 functioning as the master.

After the setting process shown in FIG. 8 is performed and the game apparatus 10 is set to be the master, the master process shown in FIG. 11 is executed by the information processing section 31 and wireless communication module 36 of the master.

First, in step S10, the master starts transmission of the beacon. After starting the transmission of the beacon in step S10, the master periodically (for example, every 100 msec.) transmits beacons while the subsequent processes of step S11 through to step S20 are being performed. Next, the master executes the process of step S11.

In step S11, the master determines whether the master has received a connection request (a registration frame) from a client. Specifically, the master determines whether the master has received a frame (an authentication frame) indicating the connection request from a client. If the determination result is affirmative, the master next executes the process of step S12. If the determination result is negative, on the other hand, the master next executes the process of step S16.

In step S12, the master starts an authentication process and executes the process of step S13.

In step S13, the master determines whether to permit the connection. If the master has determined to permit the connection, the master next executes the process of step S14. If, on the other hand, the master has determined to reject the connection, the master next executes the process of step S15. For example, the master performs the authentication process by a predetermined authentication method in step S13 to determine whether to permit the connection from the terminal from which the connection request has been transmitted. In addition, in step S13, the master refers to the registration table 80 to determine whether the number of currently registered clients is less than the maximum number of connections (for example, 15). In the exemplary embodiment, it is assumed that the authentication is an open system authentication. Namely, in step S13, if the number of currently registered clients is less than the maximum number of connections, the master permits the connection from the client from which the connection request has been transmitted. If the number of currently registered clients is equal to or greater than the maximum number of connections, the master rejects the connection from the client.

In step S14, after the master establishes the connection with the client from which the connection request has been transmitted, the master registers the client in the own apparatus. Specifically, the master transmits to the client a frame (an authentication frame) indicating the connection permission, and executes an association process by exchanging an association frame with the client. After the association process, the master and the client perform a registration process at the application level. Specifically, the client transmits to the master a frame, including the user name, for registration request. The master having received the frame for the registration request acquires information including the user name, and assigns an ID for the client. Next, the master transmits to the client a frame for registration permission. The frame for registration permission includes information such as user names and IDs of the master and other registered clients, in addition to the information such as the user name and ID of the client. By using such information, the registration process is performed at the application level between the master and the client. After completion of the registration process, the master registers the client in the registration table 80. At this time, the master registers the MAC address, user name, and ID of the client in the registration table 80. In this manner, the master registers the client in the own apparatus.

The registration process at the application level may not necessarily be performed. Namely, after the exchange of the authentication frame and the association frame between the client and the master, the master and the client may register each other. After the process of step S14, the master next executes the process of step S16.

Meanwhile, in step S15, the master transmits a frame indicating connection rejection to the client from which the connection request has been transmitted. Here, the master does not register in the registration table 80 the client from which the connection request has been transmitted. The master next executes the process of step S16.

In step S16, the master determines whether to start the game. If the determination result is affirmative, the master transmits a command indicating the start of the game to each client, and then executes the process of step S17. If the determination result is negative, the master re-executes the process of step S11. The master may determine to start the game if the number of registered clients has reached the maximum number of connections, for example. Alternatively, the master may determine to start the game if a predetermine time has elapsed since the start of the execution of the process of step S11. By the processes of steps S11 through S16 being repeatedly performed, one or more clients are registered in the master and the game is started.

In step S17, the master determines whether the master has received a probe request (a search frame). Specifically, the master determines whether the master has received the probe request which is transmitted from an audience. As will be described, although the audience basically performs data reception only, the audience can transmit information to the master by transmitting the probe request to the master. The probe request transmitted by the audience will be described below. If the determination result is affirmative, the master next executes the process of step S18. If the determination result is negative, the master next executes the process of step S19.

In step S18, the master performs a process depending on the probe request received by the master, and transmits to the audience a result of the process as a probe response (a search response frame). The master next executes the process of step S19.

In step S19, the master performs data transmission/reception process. Here, for example, the master transmits, to the client, data for the game process (operation information indicating operation performed in the own apparatus, or data representing information regarding a game character operated by the own apparatus, and the like), or the master receives data for the game process which is transmitted from the client. The data transmission/reception process performed in the master will be described in detail below. Next, the master executes the process of step S20.

In step S20, the master executes the game process. Here, the master performs the game process, in accordance with the data received in step S19 and an operation performed in the own apparatus (an operation performed on the operation buttons 14, the analog stick 15, the touch panel 13, and the like). For example, the master determines the movement of the game character 101 operated in the own apparatus or updates the position information of the game character 101, based on an operation performed in the own apparatus. Also, in step S19, the master, for example, updates the position of the game character 102, based on the operation information received from the client C1 or the position information of the game character 102 received from the client C1. Further, the master determines positions or line-of-sight directions of the virtual cameras in the virtual space, takes images of each game character by the virtual cameras, thereby generating an image. The master then displays the generated image on the upper LCD 22. After the process of step S20, the master re-executes the process of step S17.

As described above, the game is progressed by the processes of steps S17 through step S20 being repeatedly executed. If the game is ended by a user or the race game ends, the master process shown in FIG. 11 ends.

(Client Process)

Figure 12:
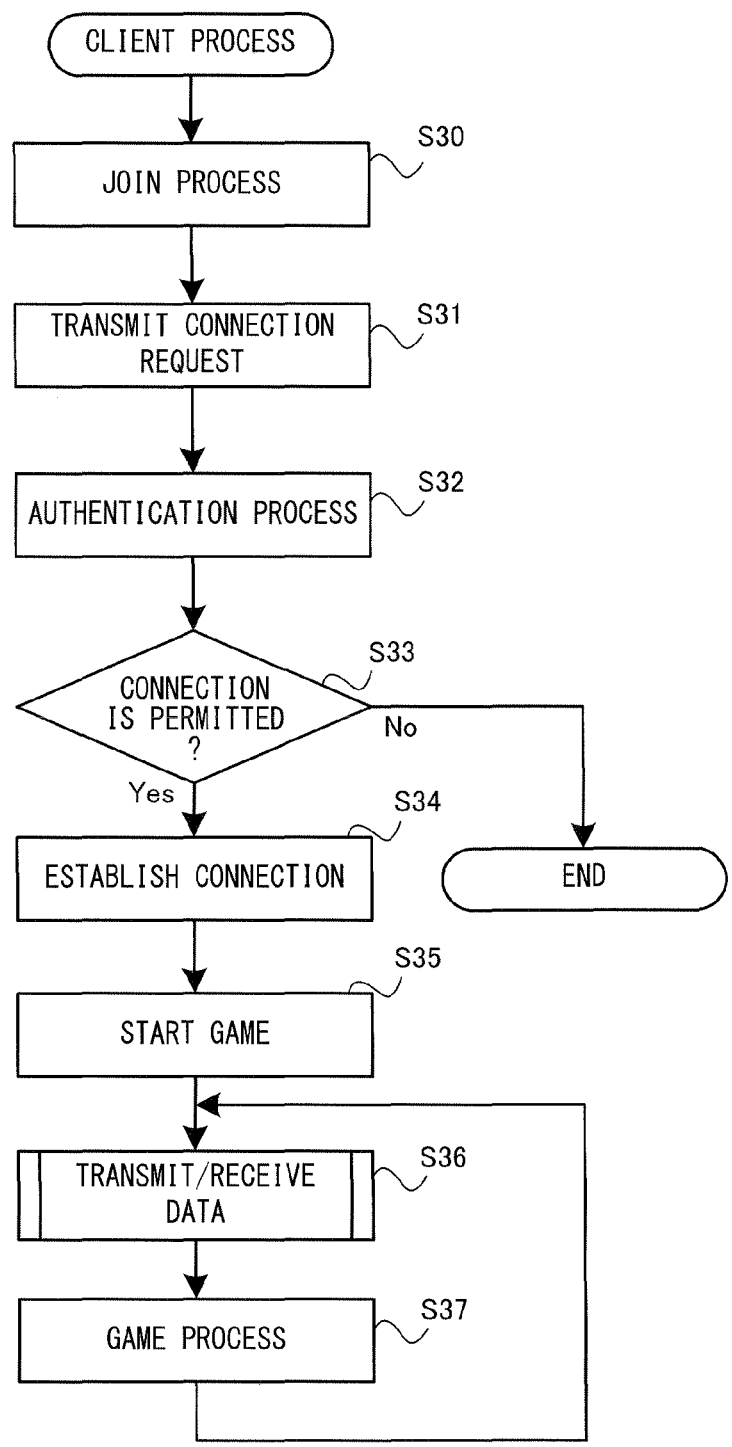
FIG. 12 is a flowchart illustrating details of a process (client process) of the non-limiting game apparatus 10 functioning as a client.

Next, a process performed in the client will be described in detail. FIG. 12 is a flowchart illustrating details of the process (the client process) of the game apparatus 10 functioning as a client.

After the setting process shown in FIG. 8 is performed and the game apparatus 10 is set to be a client, the client process shown in FIG. 12 is executed by the information processing section 31 and wireless communication module 36 of the client.

First, in step S30, the client executes a JOIN process. Specifically, the client receives the beacon transmitted from the master selected in step S5 of the setting process, and synchronizes (JOIN) with the master. The client next executes a process of step S31.

In step S31, the client transmits the connection request. Specifically, the client transmits to the master a frame indicating the connection request (the authentication frame). Next, the client executes a process of step S32.

In step S32, the client performs the authentication process with the master. Since the authentication performed in the exemplary embodiment is the open system authentication, the client next executes a process of step S33.

In step S33, the client determines whether the master has permitted of the connection to the master. Specifically, if the client has received the frame indicating the connection permission (the frame transmitted in step S14), the client next executes a process of step S34. The client, on the other hand, ends the client process shown in FIG. 12 if the client has received the frame indicating the connection rejection (the frame transmitted in step S15).

In step S34, the client establishes the connection with the master. Specifically, the client executes the association process by exchanging the association frame with the master. After the association process, the registration process is performed at the application level between the master and the client. Specifically, the client transmits to the master a frame for the registration request including the user name of the own apparatus and the predetermined information described above, and receives the frame for the registration permission from the master. After the completion of the registration process, the client stores the MAC address of the master as the identification information 73 in a memory, thereby registering the master in the own apparatus. The client next executes a process of step S35.

In step S35, the client starts the game. Specifically, the client starts the game when the client has received the command from the master indicating the start of the game. The client next executes a process of step S36.

In step S36, the client performs the data transmission/reception process. Here, the client transmits data for the game process (data such as the operation information indicating the operation performed in the own apparatus and information regarding the game character to be operated in the own apparatus) to the master or other client, or receives data for the game process transmitted from the master or other client. Details of the data transmission/reception process performed in the client will be described below. Next, the client executes a process of step S37.

In step S37, the client executes the game process. Here, the client performs the game process, in accordance with the data received in step S36 and the operation performed in the own apparatus (an operation performed on the operation buttons 14, the analog stick 15, the touch panel 13, and the like). For example, the client determines the movement of the game character 102 operated in the own apparatus or updates the position information of the game character 102, based on the operation performed in the own apparatus. In addition, the client updates the position of the game character, based on position information of a game character operated in the other game apparatus 10 or the operation information which are received from other game apparatus 10 in step S36. Further, the client determines positions and line-of-sight directions of the virtual cameras in the virtual space, takes images of each game character by the virtual cameras, thereby generating an image. The client then displays the generated image on the upper LCD 22. After the process of step S37, the client re-executes the process of step S36.

The game is progressed by the processes of step S36 through step S37 being repeatedly executed. If the game is ended by a user (if the user ends the game of the own apparatus or the game is ended by a user of the master) or the race game ends, the client process shown in FIG. 12 ends.

(Audience Process)

Figure 13:
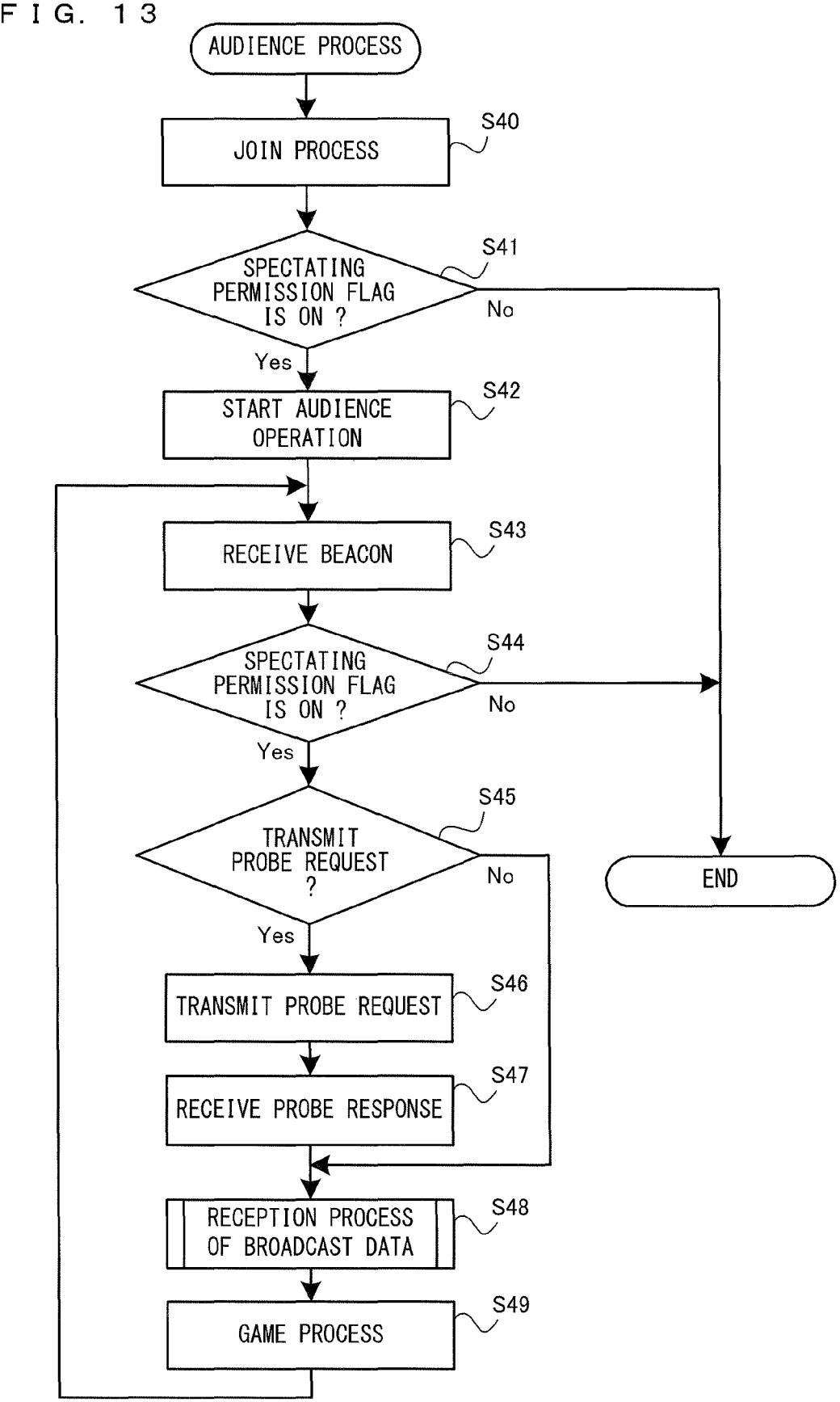
FIG. 13 is a flowchart showing details of a process (audience process) of the non-limiting game apparatus 10 functioning as an audience.

Next, the process performed in the audience will be described in detail. FIG. 13 is a flowchart showing details of the process (the audience process) of the game apparatus 10 functioning as an audience.

After the setting process shown in FIG. 8 is performed and the game apparatus 10 is set to be the audience, the audience process shown in FIG. 13 is executed by the information processing section 31 and wireless communication module 36 of the audience.

First, in step S40, the audience executes the JOIN process. The process in step S40 is the same as the process of step S30 performed in the client. Specifically, the audience receives the beacon transmitted from the master selected in step S5 of the setting process and synchronizes (JOIN) with the master. The audience next executes a process of step S41. If the audience does not receive the beacon within a predetermined time, the audience ends the audience process.

In step S41, the audience determines whether the spectating permission flag is ON. Specifically, the audience determines whether the spectating permission flag (see FIG. 9) included in the beacon received in step S40 is ON. If the determination result is affirmative, the audience next executes a process of step S42. If the determination result is negative, the audience ends the audience process shown in FIG. 13.

In step S42, the audience starts an audience operation. Specifically, the audience stores the MAC address of the master included in the beacon received in step S40 as the identification information 73 in a memory, thereby registering the master in the own apparatus. The audience next executes a process of step S43.

In step S43, the audience receives a beacon. Specifically, the audience receives a beacon from the registered master. The audience next executes a process of step S44.

In step S44, the audience determines whether the spectating permission flag is ON. The process of step S44 is the same as the process of step S41. The audience receives a beacon periodically sent from the master and determines whether the spectating permission flag included in the beacon is ON. If the determination result is affirmative, the audience next executes a process of step S45. If the determination result is negative, the audience clears the identification information 73 and ends the audience process shown in FIG. 13.

In step S45, the audience determines whether to transmit the probe request. In step S45, a first determination and a second determination are performed.

Specifically, the audience determines, as the first determination, whether a predetermined button has been pressed, for example. As described above, the user of the game apparatus 10 functioning as an audience sees the screen of the own apparatus, thereby watching the game performed between the master and the client as a spectator. In this case, the user of the audience, for example, performs a predetermined operation (for example, the button 14B, and the like) in the game apparatus 10 functioning as an audience, thereby transmitting predetermined information to the master. After the master has received the predetermined information from the audience, the master performs the game process corresponding to the predetermined information. For example, when the predetermined operation of the game apparatus 10 functioning as an audience is performed, the audience transmits a probe request frame to the master. The MAC address of the master is included in the header portion of the probe request frame. Information elements unique to vendor are included in the body portion of the probe request frame, and data for use in the game process in accordance with a predetermined operation is included in each information element. The master acquires data in accordance with the predetermined operation by receiving the probe request frame. The master then executes a predetermined process, based on the data. Specifically, for example, the master reproduces sound data representing cheers previously stored in the game apparatus 10. This reflects the cheers from audiences on the game. When the master receives the probe request from the audience, the master retrieves data, corresponding to the predetermined operation, included in the body portion of the probe request and transmits to other clients a frame including the retrieved data. Each client receives the frame from the master, and performs the same operation as that of the master, based on the data corresponding to the predetermined operation. While the master receives the probe request, the master does not register in the own apparatus the audience from which the probe request has been transmitted.

The audience determines, as the second determination, whether the audience can transmit the probe request. Specifically, the audience determines whether the own apparatus is in a predetermined mode (referred to as ROPS mode). If the audience is in the predetermined mode, the audience is forbidden to transmit the probe request, and allowed for reception only.

Figure 14:
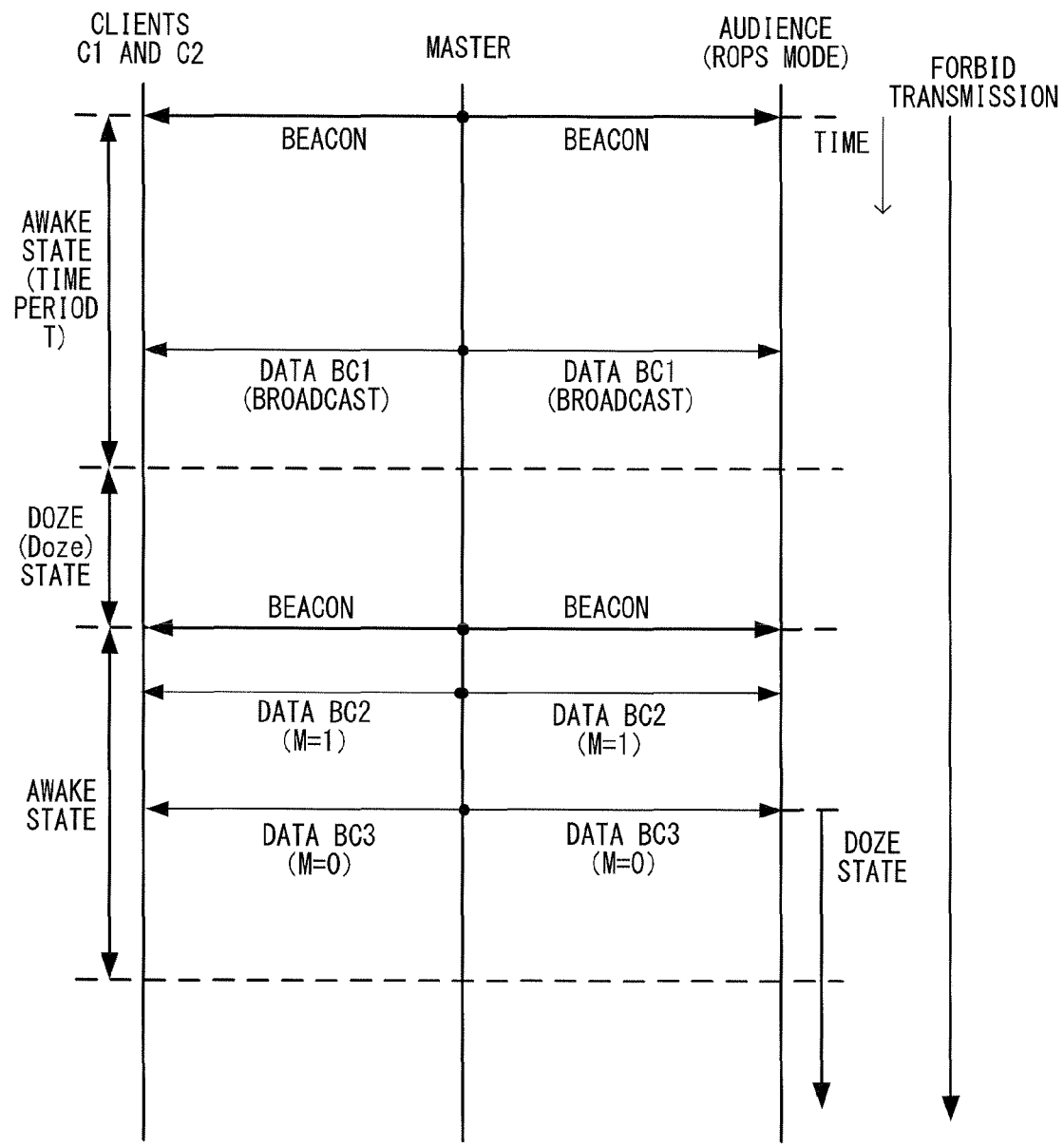
FIG. 14 is a diagram showing changes in state of each non-limiting game apparatus 10.

FIG. 14 is a diagram showing changes in state of each game apparatus 10. As shown in FIG. 14, the master periodically transmits the beacon in the broadcast fashion. The beacon includes information indicating a time period T for which an awake state is maintained or the like. During the time period T after the reception of the beacon, the master, each client, and audience remain in the awake state and can communicate therebetween. For example, as shown in FIG. 14, the master in the awake state can transmit data BC1 to each terminal (client and audience) in the broadcast fashion, and each terminal in the awake state can receive the data. On the other hand, after the time period T has elapsed since the beacon is transmitted from the master, the master and each terminal transition to a doze state (a power-saving state). In the doze state, the master and each terminal are limited in functionality of data transmission/reception, thus cannot transmit data. If further time has elapsed thereafter, the master re-transmits the beacon and the master and each terminal transition back to the awake state (immediately before the beacon is transmitted, the master and each terminal turn to be in a state where data transmission/reception is allowed). In this manner, the master and each terminal alternate the power mode in synchronization with each other.

In the case where the audience is set to be in the predetermined mode (the ROPS mode), the audience is switched to be in the doze state, based on the data transmitted from the master, in addition to the switching of the power mode by the beacon. For example, the master can include a predetermined flag M in data BC2 to be transmitted. The audience remains in the awake state when the audience receives the data BC2 having the predetermined flag M set so as to satisfy M=1. On the other hand, if the audience in a state where the ROPS mode is enabled receives data BC3 having the predetermined flag M set so as to satisfy M=0, the audience switches the own apparatus to be in the doze state. When the ROPS mode is disabled, the audience does not transition to the doze state in accordance with the value of the predetermined flag M. In the ROPS mode, the audience is forbidden to transmit the probe request, and only receives data sent from the master and the client. Setting the ROPS mode to enabled/disabled may be, for example, performed by the user of the audience in the game apparatus functioning as an audience.

While determination of whether the predetermined operation has been performed is made as the first determination, determination of, for example, whether a predetermined timing has reached may be made as the first determination. That is, for example, the audience may automatically transmit the probe request which includes data for use in the game process.

As described above, in step S45, the audience performs the first determination (determination of whether the predetermined operation has been performed) and the second determination (determination of whether the audience can transmit the probe request). If both the determination results are affirmative, the audience next executes a process of step S46. If either one of the determination results of the first determination and the second determination is negative, on the other hand, the audience next executes a process of step S48.

In step S46, the audience transmits the probe request. Specifically, the audience transmits to the master the probe request which includes the data for use in the game process. The audience next executes a process of step S47.

In step S47, the audience receives the probe response. Specifically, the audience receives the probe response transmitted from the master. The audience next executes a process of step S48.

In step S48, the audience performs the data reception process. Here, the audience receives broadcast data transmitted from the master and broadcast data transmitted from the client. The data reception process performed in the audience will be described in detail below. The audience next executes a process of step S49.

In step S49, the audience executes the game process. Specifically, the audience, for example, determines the movements of the game characters operated in the master and the client, or update the position information of the game characters, based on the broadcast data received in step S48. The audience determines positions or line-of-sight directions of the virtual cameras in the virtual space, takes images of each game character by the virtual cameras, thereby generating an image. The audience then displays the generated image on the upper LCD 22. This displays the same image on the upper LCD 22 of the audience as the image displayed on the upper LCDs 22 of the master and the client. The positions and line-of-sight directions of the virtual cameras determined in the audience may be different from those in the master and the client. In such a case, an image different from the image displayed on the screens of the master and the client is displayed on the screen of the audience. After the process of step S49, the audience re-executes the process of step S43.

How the game is progressed is displayed on the upper LCD 22 of the audience by the processes of step S43 through step S49 being repeatedly executed.

As described above, in the game according to the exemplary embodiment, one game is progressed by a plurality (or one) clients being connected to the master. The audience can watch the game which is progressed between the master and the client as a spectator by receiving the broadcast data transmitted from the master and the client.

(Outline of Data Transmission Process)

Next, the data transmission/reception process will be described. First, an outline of the data transmission process performed in the master will be described with reference to FIG. 15.

Figure 15:
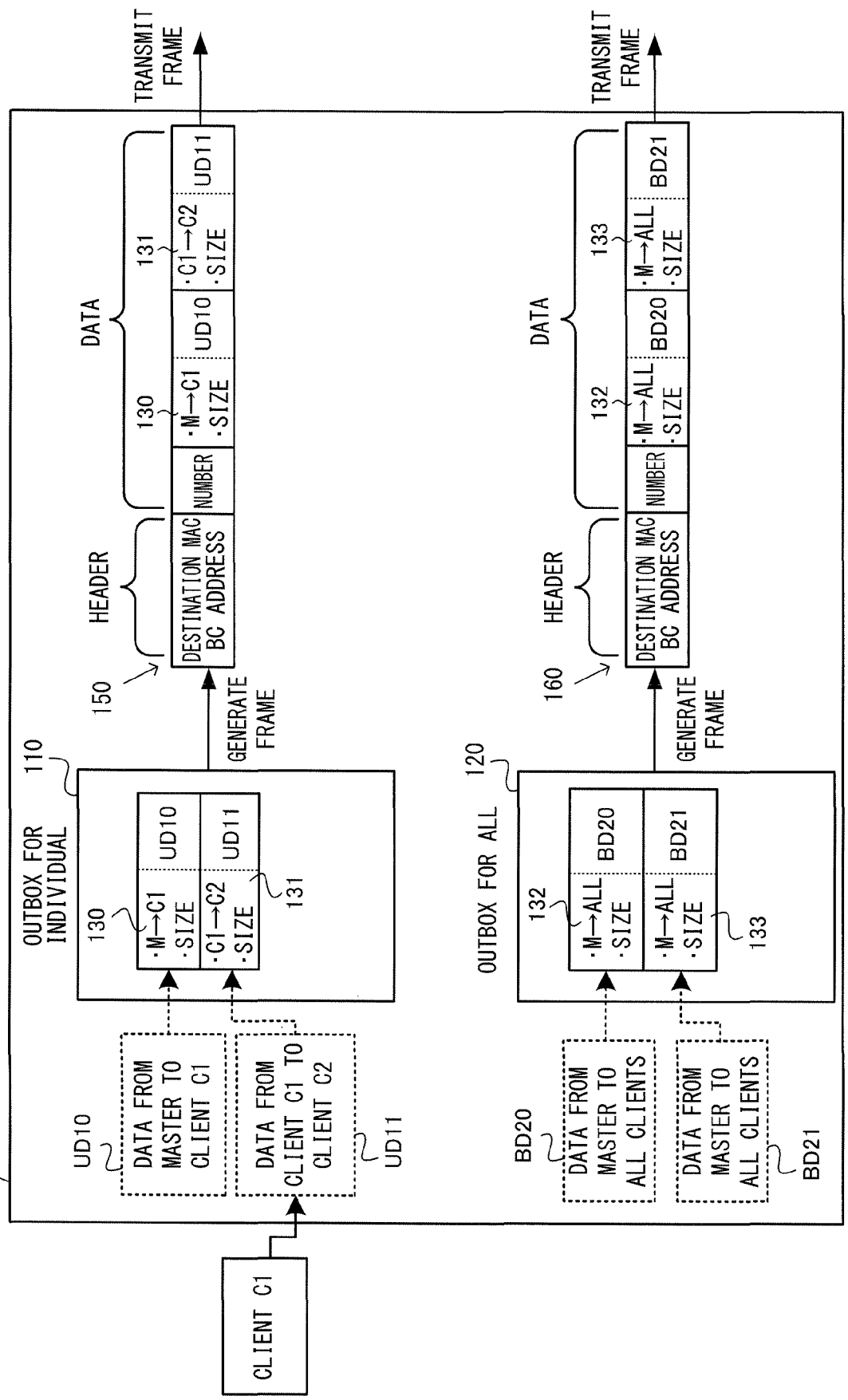
FIG. 15 is a diagram showing an outline of a data transmission process by the master.

FIG. 15 is a diagram showing the outline of the data transmission process of the master. As shown in FIG. 15, the master is provided with the outbox 110 for individual which is storing therein the individual-transmission data, and the outbox 120 for all which is storing therein the universal-transmission data.

The individual-transmission data is data separately transmitted from one terminal (the master or the client) to other terminal. The individual-transmission data is, for example, data UD10 which is transmitted from the master to the client C1, or data UD11 which is transmitted from the client C1 to the client C2. The data UD10 which is transmitted from the master to the client C1 is a batch of pieces of data that can be processed in the client C1 (data for use in the game process) and is, for example, data according to an operation performed in the master. When the client C1 receives the data UD10, the client C1 performs a predetermined process using the data UD10. Likewise, the data UD11 which is transmitted from the client C1 to the client C2 is a batch of pieces of data that can be processed in the client C2 and is, for example, data according to an operation performed in the client C1.

The universal-transmission data is data which is transmitted from the master to all clients. The universal-transmission data is, for example, data BD20 which is transmitted from the master to all clients, or data BD21 which is transmitted from the master to all clients. Similar to the individual-transmission data, the data BD20 and the data BD21 are each a batch of pieces of data that can be processed at a destination. For example, the data BD20 and the data BD21 are each piece of data according to an operation performed in the source (the master in this case), and terminals having received the data each perform a predetermined process based on each piece of data.

The master temporarily stores a plurality of the individual-transmission data to be separately transmitted to the client in the outbox 110 for individual. The master also temporarily stores a plurality of the universal-transmission data to be transmitted to all clients in the outbox 120 for all.

Specifically, as shown in FIG. 15, when the data UD10 to be transmitted from the master to the client C1 is generated by the execution of an application by the master, the master does not instantly transmit the data UD10 to the client C1, but temporarily stores the data UD10 in the outbox 110 for individual. The data UD10 is data having relatively a small size (for example, about 100 Byte). Also, when the master receives, from the client C1, the data UD11 to be transmitted from the client C1 to the client C2, the master does not instantly transmit the data UD11 to the client C2, but temporarily stores the data UD11 in the outbox 110 for individual. The data UD11 is data to be transmitted from the client C1 to the client C2, and is data to be transmitted via the master. The data UD11 is data having relatively a small size (for example, about 100 Byte). Likewise, when the data BD20 to be transmitted from the master to all clients is generated by the execution of an application by the master, the master does not instantly transmit the data BD20 in the broadcast fashion, but temporarily stores the data BD20 in the outbox 120 for all. Also, when an application generates the data BD21 to be transmitted from the master to all clients, the data BD21 is not instantly be transmitted in the broadcast fashion, but is temporarily stored in the outbox 120 for all. The data BD20 and the data BD21 is data each having relatively a small size (for example, about 100 Byte).

More specifically, when the master stores the data UD10 in the outbox 110 for individual, the master adds additional information 130 to the data UD10. The additional information 130 includes information regarding a source and destination of the data UD10. The additional information 130 also includes information regarding a size of data including the additional information 130 and the data UD10. For example, the information regarding the source and destination of the data UD10 is IDs (or may be the MAC addresses) of the master and the client C1, respectively. For example, the information regarding the source of the data UD10 is the ID (or the MAC address) of the master. The information regarding the destination of the data UD10 is the ID (or the MAC address) of the client C1. Likewise, when the master stores the data UD11 in the outbox 110 for individual, the master adds additional information 131 to the data UD11. The additional information 131 includes the information regarding a source and destination of the data UD11. The additional information 131 also includes information regarding a size of data which includes the additional information 131 and the data UD11. For example, the information regarding the source and destination of the data UD11 is IDs (or the MAC addresses) of the client C1 and the client C2, respectively.

Likewise, when the master stores the data BD20 in the outbox 120 for all, the master adds additional information 132 to the data BD20. The additional information 132 includes information regarding a source and destination of the data BD20. The additional information 132 also includes information regarding a size of data which includes the additional information 132 and the data BD20. For example, the information regarding the source and destination of the data BD20 is IDs (or may be the broadcast addresses) indicating that the source and the destination are the master and all terminals (the entire network including the master, the clients, and the audience), respectively. Likewise, when the master stores the data BD21 in the outbox 120 for all, the master adds additional information 133 to the data BD21. The additional information 133 includes information regarding a source and destination of the data BD21. The additional information 133 also includes information regarding a size of data which includes the additional information 133 and the data BD21. For example, the information regarding the source and destination of the data BD21 is IDs (or may be the broadcast addresses) indicating that the source and the destination are the master and all terminals, respectively.

The outbox 110 for individual has a predetermined size (for example, 1500 Byte). When storing data in the outbox 110 for individual, the master determines whether the data can be stored therein, based on an available space in the outbox 110 for individual. If the master determines that no more data can be stored in the outbox 110 for individual, the master retrieves all data stored in the outbox 110 for individual, and generates one frame which includes the all data. For example, if the master determines that no more data can be stored in the outbox 110 for individual, the master generates one frame 150 which includes the data UD10 and the data UD11, and transmits the frame 150. As shown in FIG. 15, the broadcast address is specified as the destination MAC address in the header portion of the frame 150. The data portion of the frame 150 includes the data UD10 having the additional information 130 added thereto and the data UD11 having the additional information 131 added thereto. The data portion of the frame 150 further includes the number of pieces of data included in the data portion (2, in the example shown in FIG. 15). In this manner, the master includes, in one frame 150, the data UD10 to be transmitted from the master to the client C1 and the data UD11 to be transmitted from the client C1 to the client C2, and transmits the frame 150 in the broadcast fashion.

Likewise, the outbox 120 for all has a predetermined size (for example, 1500 Byte), and when storing data in the outbox 120 for all, the master determines whether data can be stored therein, based on an available space in the outbox 120 for all. If the master determines that no more data can be stored in the outbox 120 for all, the master retrieves all data stored in the outbox 120 for all, and generates one frame 160 which includes the all data. As shown in FIG. 15, the broadcast address is specified as the destination MAC address in the header portion of the frame 160. The data portion of the frame 160 includes the data BD20 having the additional information 132 added thereto and the data BD21 having the additional information 133 added thereto. The data portion of the frame 160 further includes the number of pieces of data included in the data portion (2, in the example shown in FIG. 15). In this manner, the master includes, in one frame 160, the data BD20 and the data BD21 each having a small size, and transmits the frame 160 in the broadcast fashion.

As in the master, the client is provided with the outbox 110 for individual which is storing therein the individual-transmission data, and the outbox 120 for all which is storing therein the universal-transmission data. In the case of the client, however, the client cannot transmit data transmitted from another client to other client. Therefore, a plurality of pieces of data only to be transmitted from the own apparatus to other client is stored in the outbox 110 for individual in the client.

(Outline of Data Reception Process)

Figure 16:
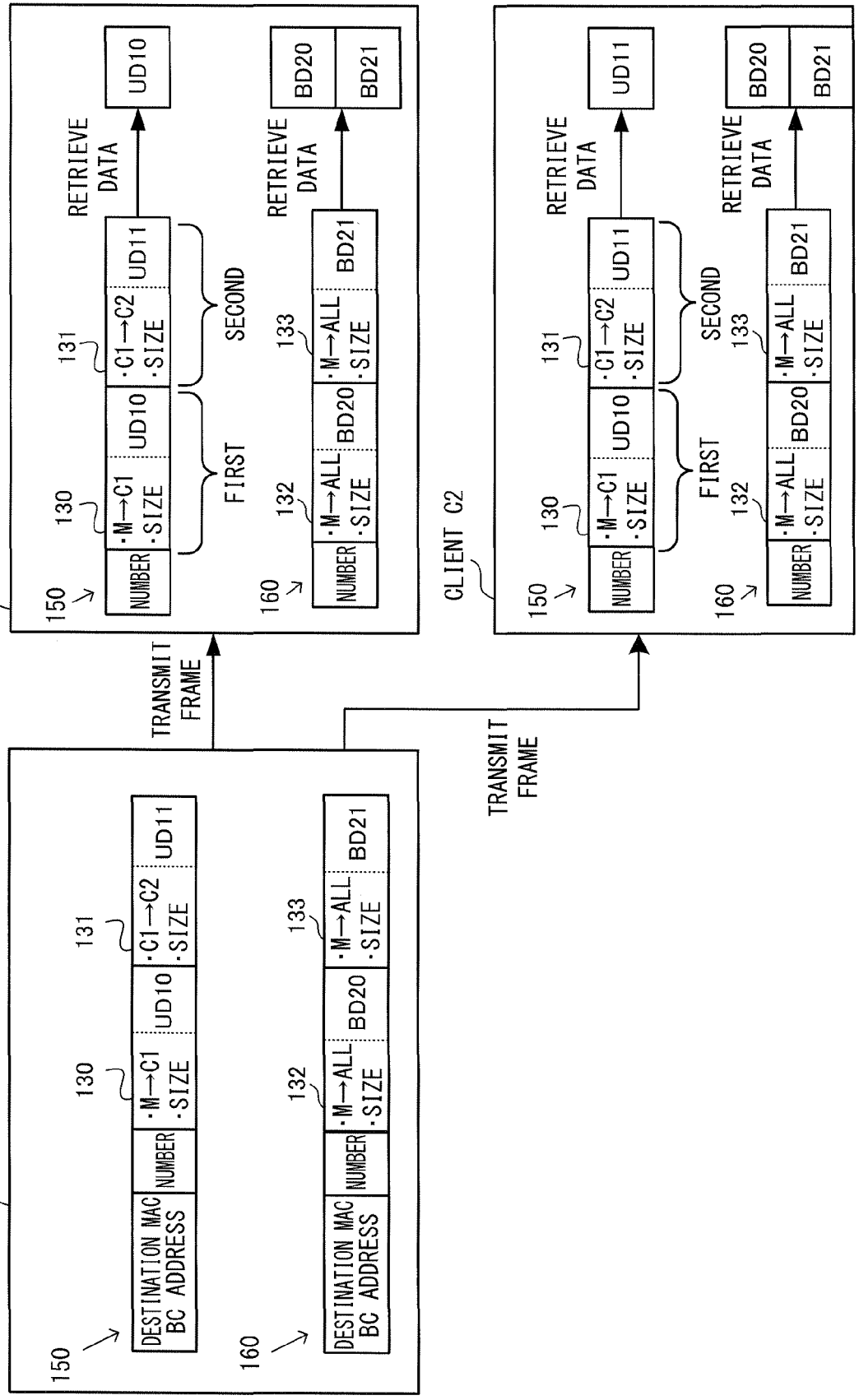
FIG. 16 is a diagram showing an outline of a reception process performed in the client when the client has received a frame transmitted from the master.

Next, an outline of the data reception process will be described. When each client has received the frame transmitted from the master as described above, each client acquires only data destined for the own apparatus included in the received frame. FIG. 16 is a diagram showing the outline of the reception process performed in the client when the client has received the frame transmitted from the master.

As shown in FIG. 16, when the master transmits the frame 150, the client C1 and the client C2 receive the frame 150. The client C1 having received the frame 150 refers to the additional information 130 of the first data (the data which includes the additional information 130 and the data UD10) included in the frame 150, and determines whether the data is destined for the own apparatus. The first data is data transmitted from the master to the client C1, and thus, the client C1 retrieves only the first data which includes the data UD10. Next, the client C1 refers to the additional information 131 of the second data (the data which includes the additional information 131 and the data UD11), and determines whether the second data is destined for the own apparatus. The beginning of the second data is determined based on the data size indicated by the additional information 130 of the first data. The second data is data transmitted from the client C1 to the client C2, and thus the client C1 discards the second data.

The client C2 having received the frame 150 refers to the additional information 130 of the first data (the data which includes the additional information 130 and the data UD10) included in the frame 150, and determines whether the data is destined for the own apparatus. The first data is data transmitted from the master to the client C1, and thus the client C2 discards the first data. Next, the client C2 refers to the additional information 131 of the second data (the data which includes the additional information 131 and the data UD11), and determines whether the second data is destined for the own apparatus. The second data is data transmitted from the client C1 to the client C2, and thus the client C2 retrieves only the second data which includes the data UD11.

The same process is also performed with respect to the frame 160 in each client, and corresponding data is retrieved. In this case, each client retrieves all data (the data BD20 and the data BD21) included in the frame 160. Specifically, all terminals are specified as the destination in the additional information 132 of the first data (the data which includes the additional information 132 and the data BD20) of the frame 160. Therefore, the client C1 and the client C2 retrieve the first data which includes the data BD20. Likewise, all terminals are specified as the destination in the additional information 133 of the second data (the data which includes the additional information 133 and the data BD21) of the frame 160. Therefore, the client C1 and the client C2 retrieve the second data which includes the data BD21.

In this manner, each client retrieves only data destined for the own apparatus and for all clients from a frame transmitted from the master, and discards the other data.

(Details of Data Transmission Process)

Next, details of the data transmission process will be described. First, details of the data transmission process performed in the master will be described with reference to FIG. 17.

(Data Transmission Process of Master)

Figure 17:
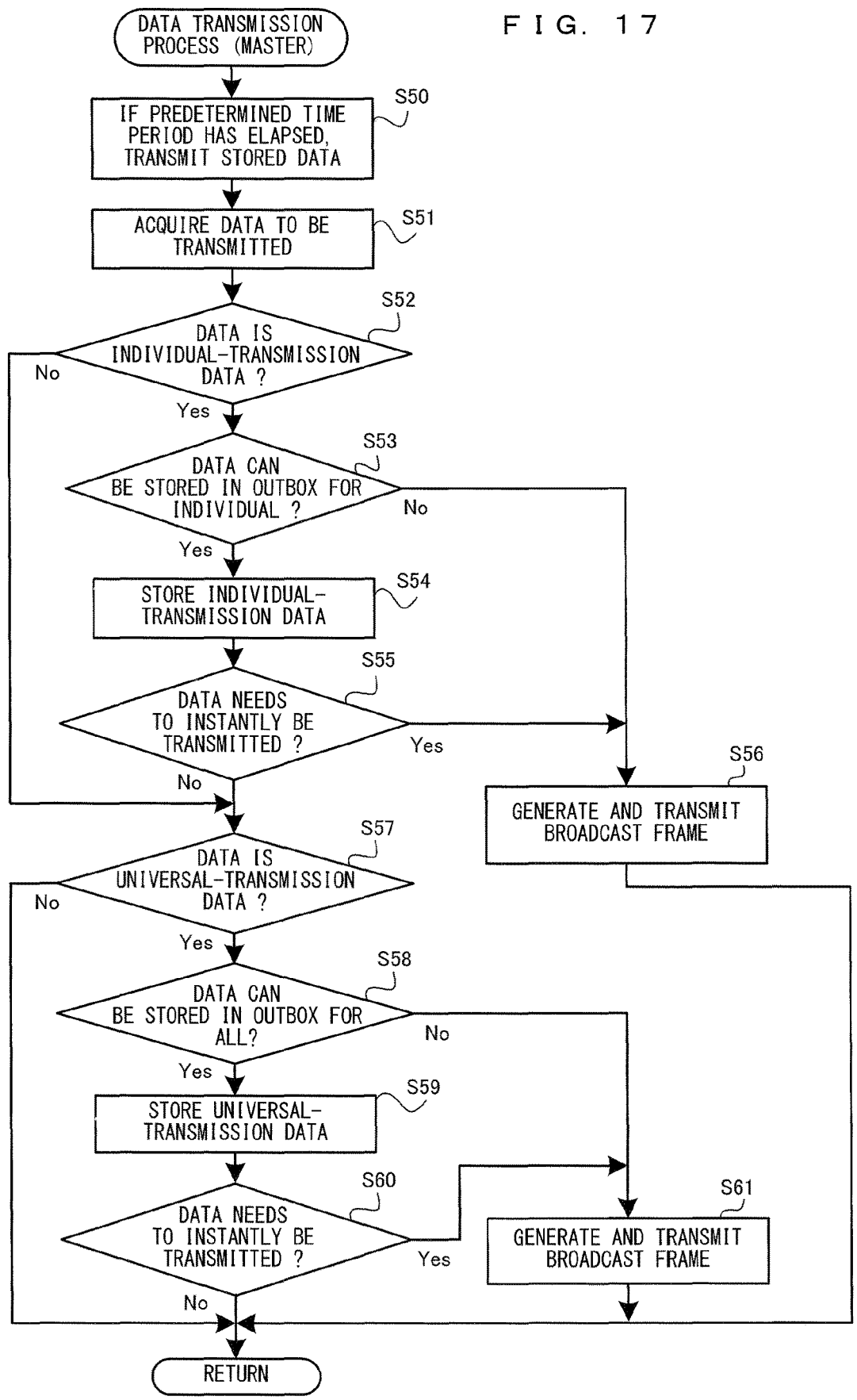
FIG. 17 is a flowchart illustrating details of a data transmission process (master) performed in the master.

FIG. 17 is a flowchart illustrating details of the data transmission process (master) performed in the master. Processes of step S50 through step S61 shown in FIG. 17 are repeatedly executed at predetermined time intervals.

First, in step S50, if a predetermine time has elapsed since the master stores data in the outbox 110 for individual and the outbox 120 for all, the master transmits all data stored therein. If the predetermine time has not elapsed since the master stores data in the outbox 110 for individual and the outbox 120 for all, the master does not transmit the stored data. Specifically, if data is stored in the outbox 110 for individual, the master determines if the predetermine time has elapsed since the oldest data, among the data stored in the outbox 110 for individual, is stored therein. If the determination result is affirmative, the master retrieves all data stored in the outbox 110 for individual, generates one frame which includes the all data, and transmits the frame in the broadcast fashion. The MAC address of the master is included in the header portion of the generated frame.

Likewise, if data is stored in the outbox 120 for all, the master determines if a predetermine time has elapsed since the oldest data, among the data stored in the outbox 120 for all, is stored therein. If the determination result is affirmative, the master retrieves all data stored in the outbox 120 for all, generates one frame which includes the all data, and transmits the frame in the broadcast fashion. The MAC address of the master is included in the header portion of the generated frame. After the process of step S50, the master next executes a process of step S51.

In step S51, the master acquires data to be transmitted. The data to be transmitted which is acquired here is, for example, data (data generated in the course of the game process such as data according to the operation performed in the master) generated by the master (the application layer). The data to be transmitted which is acquired here is, for example, data received from one client and to be transmitted to another client via the master. The data to be transmitted which is acquired here is, for example, data received from one client and to be transmitted to all terminals via the master. More specifically, the data to be transmitted is, for example, the UD10, UD11, BD20, and BD21 shown in FIG. 15. For example, when an operation is performed on an operation button 14 of the own apparatus, the master generates data according to the operation. The master acquires the generated data in step S51. Also, if, for example, data is transmitted from the client C1 to the client C2 via the master, the master receives the data from the client C1 (the data reception process of the master will be described below). The master acquires the received data in step S51. The master next executes a process of step S52.

In step S52, the master determines whether the acquired data is the individual-transmission data. Specifically, the master determines whether the data acquired in step S51 is data (the UD10 or the UD11) to separately be transmitted to each client. For example, if an operation for transmitting separate data from the master to other clients is performed, the master determines that the acquired data is data to separately be transmitted to each client. If the determination result is affirmative, the master next executes a process of step S53. If the determination result is negative, on the other hand, the master next executes a process of step S57.

In step S53, the master determines whether the acquired data can be stored in the outbox 110 for individual. Specifically, the master determines whether the data acquired in step S51 can be stored in the outbox 110 for individual, based on sizes of the data acquired in step S51 and data stored in the outbox 110 for individual. If the determination result is affirmative, the master next executes a process of step S54. If the determination result is negative, on the other hand, the master next executes a process of step S56.

In step S54, the master stores the data acquired in step S51 in the outbox 110 for individual. Specifically, the master adds additional information to the data acquired in step S51, and stores the resultant data in the outbox 110 for individual. More specifically, the master adds, as additional information, the information regarding a source and destination of the data and information regarding the size. The master next executes a process of step S55.

In step S55, the master determines whether to instantly transmit the acquired data. For example, the master determines, upon the acquisition of the data in step S51, whether to instantly transmit the acquired data, based on a parameter specified by the application layer. If the determination result is affirmative, the master next executes a process of step S56. If the determination result is negative, on the other hand, the master next executes a process of step S57.

Meanwhile, in step S56, the master retrieves all data stored in the outbox 110 for individual, generates one frame which includes the all data, and transmits the frame in the broadcast fashion (transmits a broadcast frame). The MAC address of the master is included in the header portion of the generated frame. By the process of step S56 being performed, the all data (the UD10 and UD11) stored in the outbox 110 for individual is transmitted in the broadcast fashion, and the outbox 110 for individual becomes empty. After the transmission of the frame, the master adds additional information to the data that cannot be stored in the outbox 110 for individual in step S53, and stores the data in the empty outbox 110 for individual. If the size of data acquired in step S51 is larger than the size of the outbox 110 for individual, the master cannot store the data in the outbox 110 for individual. Therefore, the master divides the data into a plurality of frames and transmits the frames.

If the acquired data cannot be stored in the outbox 110 for individual (the determination result in step S53 is negative) and also the acquired data needs to instantly be transmitted, the master generates one frame which includes all data stored in the outbox 110 for individual and transmits the frame. The master thereafter further generates one frame which includes the data that needs to instantly be transmitted and the additional information (the information regarding the source and destination) of the data, which are acquired in step S51, and transmits the frame. In this manner, the all data stored in the outbox 110 for individual is transmitted and the data acquired in step S51 that needs to instantly be transmitted is also transmitted.

Also, if the own apparatus is in the doze state in step S56, the master temporarily saves the generated frame in a memory, and transmits the frame after the own apparatus has transitioned to the awake state. That is, data transmission is limited in the doze state, and thus the master transmits the frame after the own apparatus has transitioned from the doze state to the awake state. In the case where the master generates a frame and temporarily saves the frame in a memory when being in the doze state, the master sets the predetermined flag M, which is included in the frame, to 1. In the case where the master generates a frame in the awake state, the master sets 0 to the predetermined flag M included in the frame, and transmits the frame. When the ROPS mode is enabled as described above, the audience having received the frame remains in the awake state according to the value of the predetermined flag M, or transitions to the doze state. After the process of step S56, the master ends the transmission process shown in FIG. 17.

In step S57, the master determines whether the data acquired in step S51 is the universal-transmission data. Specifically, the master determines whether the data acquired in step S51 is data (the BD20 or BD21) to be transmitted to all clients. For example, if an operation is performed on the game character 101 operated in the master (an operation on the operation buttons 14 or the like), the master determines that the acquired data is data to be transmitted to all clients. If the determination result is affirmative, the master next executes a process of step S58. If the determination result is negative, on the other hand, the master ends the process shown in FIG. 17.

In step S58, the master determines whether data can be stored in the outbox 120 for all. Specifically, the master determines whether the data acquired in step S51 can be stored in the outbox 120 for all, based on the size of the data acquired in step S51 and the available size of the outbox 120 for all. If the determination result is affirmative, the master next executes a process of step S59. If the determination result is negative, on the other hand, the master next executes a process of step S61.

In step S59, the master stores the data acquired in step S51 in the outbox 120 for all. Specifically, the master adds additional information to the data acquired in step S51, and stores the resultant data in the outbox 120 for all. More specifically, the master adds, as additional information, the information regarding a source and destination of the data and information regarding the size. Here, information, as destination information, that the destination is all terminals is added. After the process of step S59, the master next executes a process of step S60.

In step S60, the master determines whether the data needs to instantly be transmitted. For example, the master determines, upon the acquisition of the data instep S51, whether the data needs to instantly be transmitted, based on the parameter specified by the application layer. If it is determined that the data needs to instantly be transmitted, the master stores the data acquired in step S51 in the outbox 120 for all and next executes a process of step S61. If the determination result is negative, on the other hand, the master ends the transmission process shown in FIG. 17.

Meanwhile, in step S61, the master retrieves all data stored in the outbox 120 for all, generates one frame which includes the all data, and transmits the frame in the broadcast fashion. The MAC address of the master is included in the header portion of the generated frame. By the process of step S61 being performed, the all data (the BD20 and BD21) stored in the outbox 120 for all is transmitted in the broadcast fashion. After the transmission of the frame, the master adds additional information to data that cannot be stored in the outbox 120 for all in step S59, and stores the resultant data in the empty outbox 120 for all. If the size of data acquired in step S51 is larger than the size of the outbox 120 for all, the master cannot store the data in the outbox 120 for all. Therefore, the master divides the data into a plurality of frames and transmits the frames. Also, if it is determined in step S58 that the data acquired in step S51 cannot be stored in the outbox 120 for all and the data acquired in step S51 also needs to instantly be transmitted, the master transmits one frame which includes the all data stored in the outbox 120 for all, and thereafter further transmits one frame which includes the data acquired in step S51. After the process of step S61, the master ends the transmission process shown in FIG. 17.

(Data Transmission Process of Client)

Figure 18:
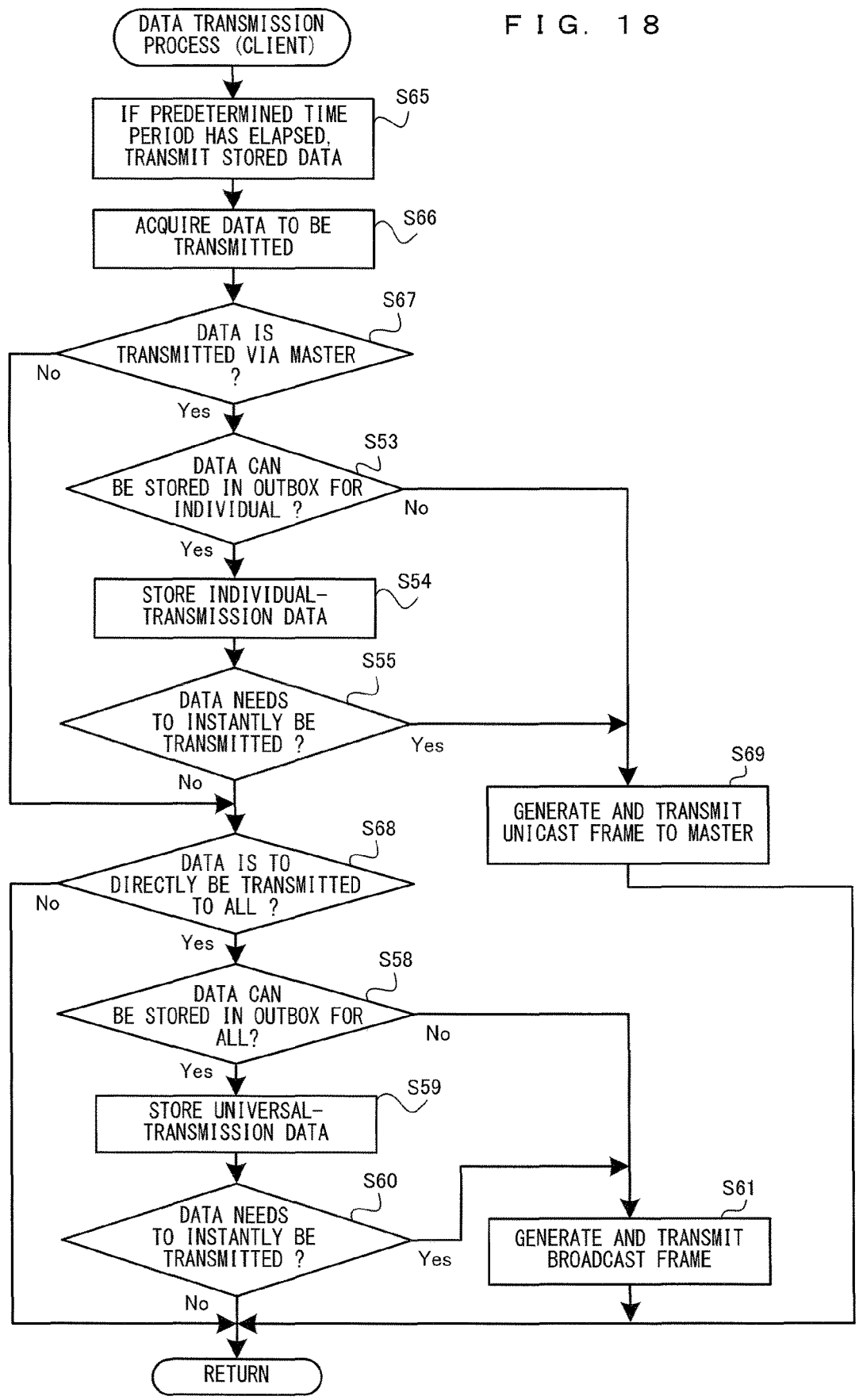
FIG. 18 is a flowchart illustrating details of a data transmission process (client) performed in the client.

Next, details of the data transmission process performed in the client will be described with reference to FIG. 18. FIG. 18 is a flowchart illustrating details of the data transmission process (client) performed in the client. The same reference numerals are given to process steps in FIG. 18 that are the same as those in FIG. 17, and the description thereof is omitted.

In the data transmission process performed in the client, the data stored in the outbox 110 for individual is transmitted to the master not in the broadcast fashion but in a unicast fashion.

First, the client performs a process of step S65 instead of the process of step S50 that is executed in FIG. 17. In step S65, if a predetermine time has elapsed since data is stored in the outbox 110 for individual and the outbox 120 for all, the client transmits the all data stored therein. If the predetermine time has not elapsed since the data is stored in the outbox 110 for individual and the outbox 120 for all, the client does not transmit the data stored therein. In this case, instead of transmitting the data stored in the outbox 110 for individual in the broadcast fashion, the client transmits the data to the master in the unicast fashion. Specifically, if data is stored in the outbox 110 for individual, the client determines if the predetermine time has elapsed since the oldest data, among the data stored in the outbox 110 for individual, is stored therein. If the determination result is affirmative, the client retrieves the all data stored in the outbox 110 for individual, generates one frame which includes the all data, and transmits the frame to the master in the unicast fashion.

Likewise, when data is stored in the outbox 120 for all, the client determines if the predetermine time has elapsed since the oldest data, among data stored in the outbox 120 for all, is stored therein. If the determination result is affirmative, the client retrieves the all data stored in the outbox 120 for all, generates one frame which includes the all data, and transmits the frame in the broadcast fashion. In this case, the MAC address of the master as the BSSID is included in the header portion of the generated frame as the source address together with the MAC address of the own apparatus (client). After the process of step S65, the client next executes a process of step S66.

In step S66, the client acquires data to be transmitted. Here, the data to be transmitted is data generated by the client (data generated in the course of the game process such as data according to the operation performed in the own apparatus). Since the client does not forward, like the master does, data transmitted from another terminal to other terminal, the client in step S66 acquires data generated by the client itself. Next, the client executes a process of step S67.

In step S67, the client determines whether the data acquired in step S66 is data to be transmitted via the master. Specifically, if the acquired data is the individual-transmission data (data to separately be transmitted to other client), the client determines that the data is data to be transmitted via the master. Even if the acquired data is the universal-transmission data (data to be transmitted to all terminals), the client determines that the data is data to be transmitted via the master if a predetermined criterion is satisfied. For example, if the type of the acquired data falls in a predetermined type (for example, the data is data according to the operation performed in the own apparatus and is data to be shared with all terminals), or the data is specified by the application layer, the client determines that the data is data to be transmitted via the master while the acquire data is the universal-transmission data.

Figure 22:
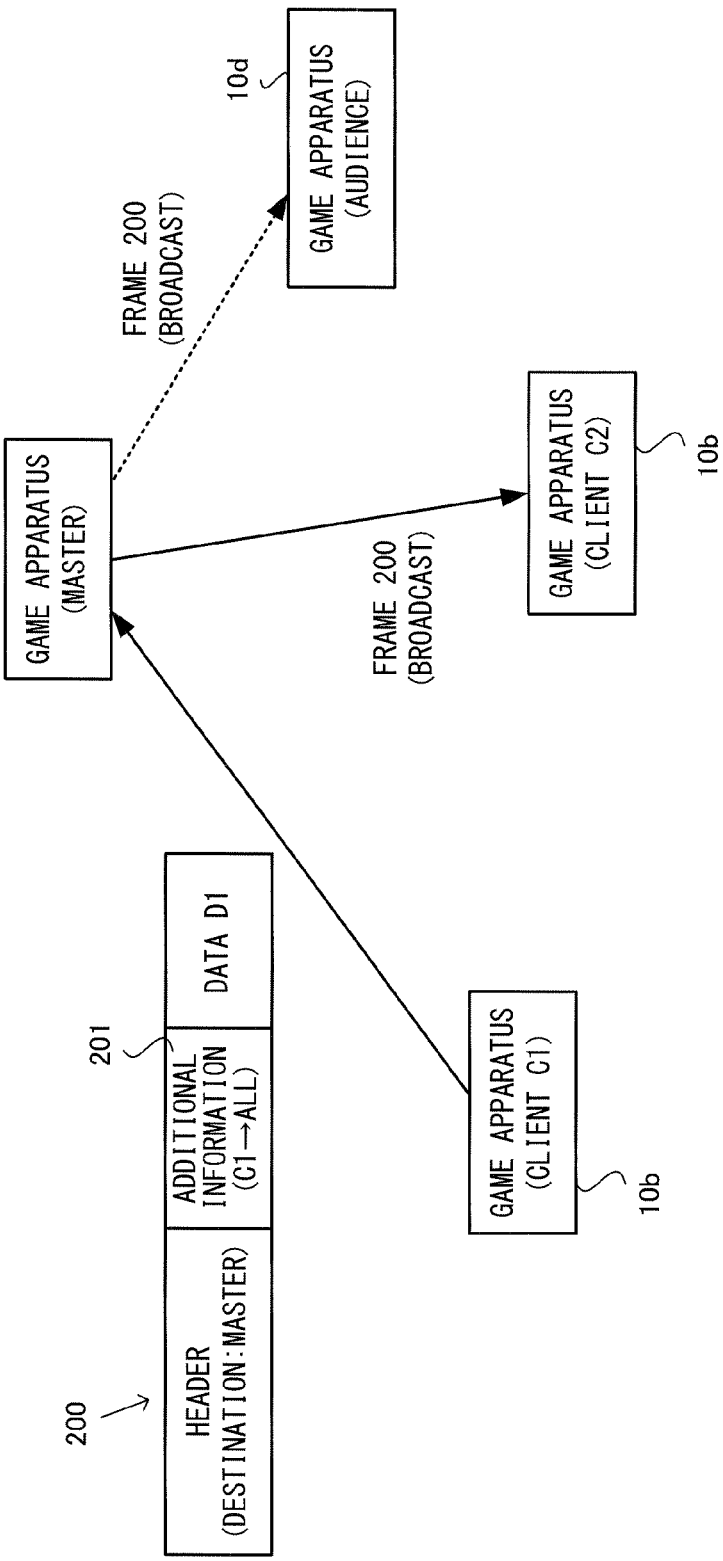
FIG. 22 is a diagram showing how data is transmitted from an example of a non-limiting client C1 to all terminals via the master.

FIG. 22 is a diagram showing how data is transmitted from the client C1 to all terminals via the master. As shown in FIG. 22, the client C1 generates a frame 200 which includes data D1 generated by the own apparatus, and transmits the frame 200 to the master. The MAC address of the master is specified as the destination MAC address in the header portion of the frame 200. The frame 200 also includes the data D1 and additional information 201. The additional information 201 is information indicating a source and destination of the data D1. Specifically, the source information is information indicating the client C1, and the destination information is information indicating all terminals (all terminals including the master, the client C2, and the audience). The master having received the frame 200 retrieves therefrom the data D1 and the additional information 201, stores the data D1 and the additional information 201 in the outbox 120 for all, and transmits a frame which includes the data D1 and the additional information 201 in the broadcast fashion.

If the determination result is affirmative in step S67, the client next executes a process of step S53. If the determination result is negative, on the other hand, the client next executes a process of step S68.

After performing the processes of step S53 through step S55, the client executes a process of step S68.

In step S68, the client determines whether the data acquired in step S66 is data to directly be transmitted to each terminal. The data to directly be transmitted to all terminals is data which is transmitted directly from the client to the other terminals in the broadcast fashion. The client can transmit the data to all terminals in the broadcast fashion without via the master.

FIG. 23 is a diagram showing how the client C1 directly transmits data to all terminals. As shown in FIG. 23, the client C1, for example, generates a frame 210 which includes data D2 generated by the own apparatus, and transmits the frame 210 to all terminals in the broadcast fashion. The broadcast address is specified as the destination MAC address in the header portion of the frame 210. The frame 210 also includes the data D2 and additional information 211. The additional information 211 is information indicating a source (the client C1) and destination (all terminals) of the data D2. Each terminal (the master, the client C2, and the audience) receives the frame 210 to acquire the data D2. In this manner, the client can directly transmit data to all terminals without via the master.

If the determination result is affirmative in step S68, the client next executes a process of step S58. If the determination result is negative, on the other hand, the client ends the process shown in FIG. 18.

In addition, the client executes a process of step S69 instead of the process of step S56 shown in FIG. 17.

In step S69, the client retrieves the all data stored in the outbox 110 for individual, generates one frame which includes the all data, and transmits the frame to the master in the unicast fashion (transmits a unicast frame). The process of step S69 is the same as the process of step S56 shown in FIG. 17 except that the generated frame in step S69 is transmitted to the master not in the broadcast fashion but in the unicast fashion. This is the end of description of FIG. 18.

In this manner, the client transmits data stored in the outbox 110 for individual in the unicast fashion.

(Details of Data Reception Process)

Next, details of the data reception process will be described. First, details of the data reception process performed in the client will be described with reference to FIG. 19.

(Data Reception Process of Client)

Figure 19:
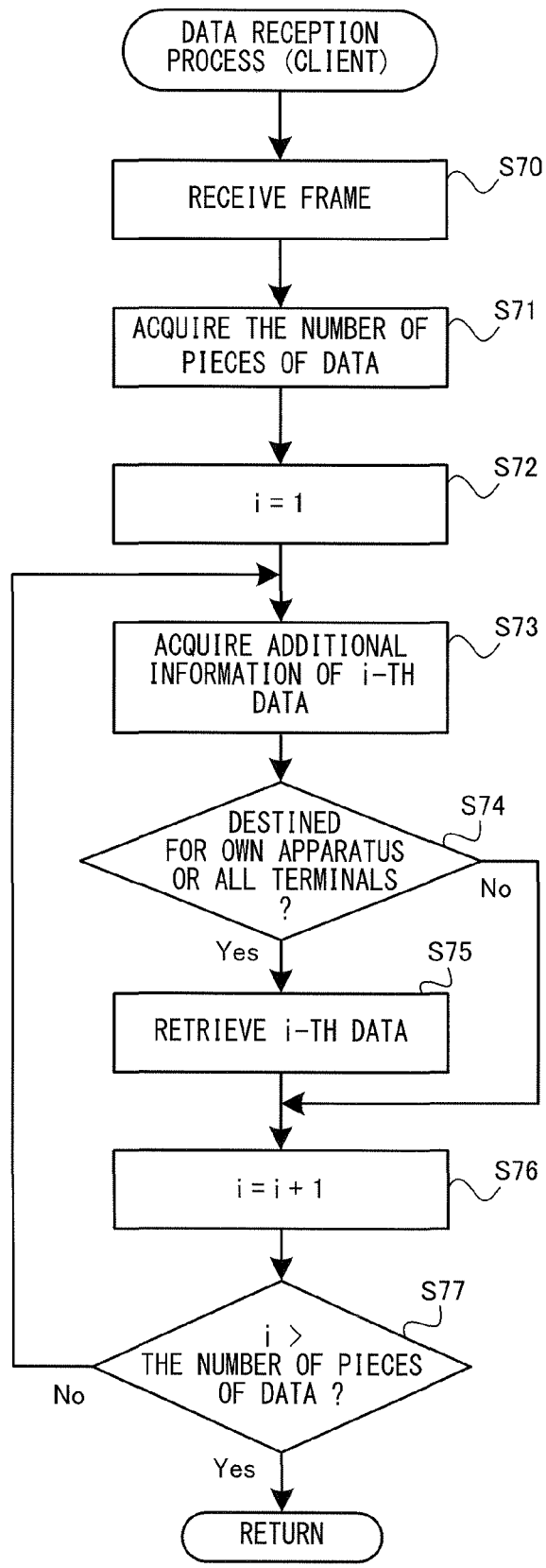
FIG. 19 is a flowchart illustrating details of a data reception process performed in the client.

FIG. 19 is a flowchart illustrating details of the data reception process performed in the client.

First, in step S70, the client receives a frame. Specifically, the client receives only a frame destined for the own apparatus and a frame transmitted in the broadcast fashion. More specifically, the client receives a frame which has the destination address matching the MAC address of the own apparatus. The client also receives a frame which has the broadcast address as the destination address and which includes information matching the identification information 73 (the MAC address of the master) stored in a memory of the own apparatus. Since a broadcast frame, transmitted by the master or the client, includes a BSSID (matching the MAC address of the master), the client receives the broadcast frame if the BSSID matches the identification information 73. The client next executes a process of step S71.

In step S71, the client refers to the data portion of the frame acquired in step S70 to acquire the number of pieces of data included in the frame (see FIG. 15). The client next executes a process of step S72.

In step S72, the client sets 1 to a variable i, and next executes a process of step S73.

In step S73, the client acquires the additional information of i-th data. That is, the client acquires the additional information (the information regarding the source and destination, and the information regarding the size) of i-th data in the data portion of the frame acquired in step S70. The client next executes a process of step S74.

In step S74, the client determines whether the i-th data is destined for the own apparatus or all terminals. Here, all terminals mean all terminals within the network, including the master, the client, and the audience. Specifically, the client refers to, among the additional data acquired in step S73, information regarding the destination to determine whether the i-th data is destined for the own apparatus or all terminals. More specifically, the client determines whether the information regarding the destination matches the ID of the own apparatus (or matches the MAC address of the own apparatus). The client also determines whether the information regarding the destination is a value indicating that the destination is all terminals (or the broadcast address). If the determination result is affirmative, the client next executes a process of step S75. If the determination result is negative, on the other hand, the client next executes a process of step S76.

In step S75, the client retrieves the i-th data (see FIG. 16). The retrieved i-th data is stored in a memory. Subsequently, the game process using the i-th data stored in the memory is performed in the above-described game process (step S37). For example, the game process is performed using the source information (for example, information indicating that the source is the master) indicated by the additional information included in the i-th data and a body of data (for example, the data UD10) included in the i-th data. The client next executes a process of step S76.

In step S76, the client adds 1 to the variable i, and next executes a process of step S77.

In step S77, the client determines whether the variable i is greater than the number of pieces of data acquired in step S71, and if the determination result is affirmative, the client ends the reception process shown in FIG. 19. If the determination result is negative, on the other hand, the client re-executes the process of step S73.

By the processes of step S73 through step S77 being repeated, only data destined for the own apparatus and all clients is retrieved among the data included in the received frame.

(Data Reception Process of Audience)

Figure 20:
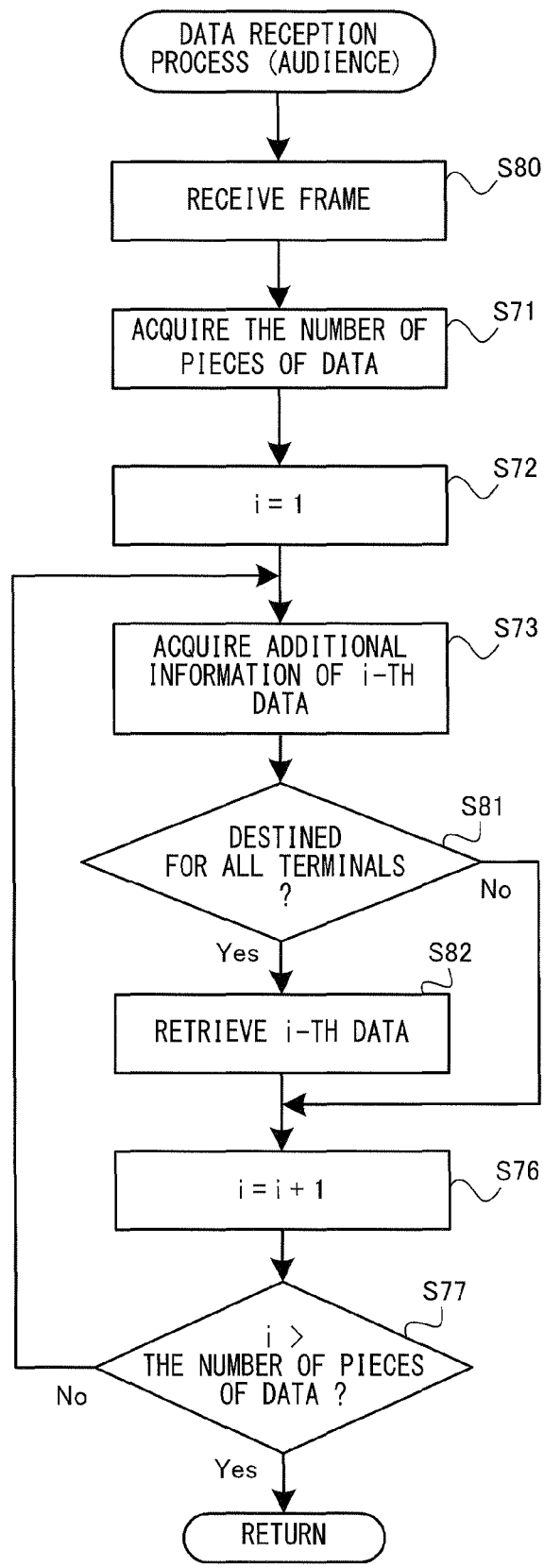
FIG. 20 is a flowchart illustrating details of a data reception process (audience) performed in the audience.

Next, details of a data reception process performed in the audience will be described with reference to FIG. 20. FIG. 20 is a flowchart illustrating the details of the data reception process (audience) performed in the audience. The same reference numerals are given to process steps in FIG. 20 that are the same as those in FIG. 19, and the description thereof is omitted.

First, in step S80, the audience receives a frame. Specifically, the audience receives a frame transmitted thereto in the broadcast fashion. More specifically, the audience receives a frame which has the broadcast address as the destination address and which includes information matching the identification information 73 (the MAC address of the master) stored in a memory of the own apparatus. Since a broadcast frame, transmitted by the master or the client, includes a BSSID, the audience receives the broadcast frame if the BSSID matches the identification information 73 stored in the memory of the own apparatus. The audience next executes processes of step S71 through step S73.

After the process of step S73, the audience executes a process of step S81.

In step S81, the audience determines whether the i-th data acquired in step S73 is destined for all terminals. Specifically, the audience refers to information regarding the destination, among the additional information acquired in step S73, to determine whether the i-th data is destined for all terminals. More specifically, the audience determines whether the information regarding the destination has a value indicating that the destination is all terminals (or the information includes the broadcast address). If the determination result is affirmative, the audience next executes a process of step S82. If the determination result is negative, on the other hand, the audience next executes a process of step S76.

In step S82, the audience retrieves the i-th data. The retrieved i-th data is stored in a memory. Subsequently, the game process using the i-th data stored in the memory is performed in the above-described game process (step S49). For example, the game process is performed using the information regarding the source and destination indicated by the additional information included in the i-th data, and a body of data included in the i-th data. In this manner, the audience performs the game process using data, included in the received frame, which is destined for all terminals, thereby obtaining a result of the game process according to the operations performed in the master and each client. The audience next executes processes of step S76 and step S77.

In this manner, in the audience, all data included in the frame is separately retrieved and the game process is performed based on the separately retrieved data.

(Data Reception Process of Master)

Figure 21:
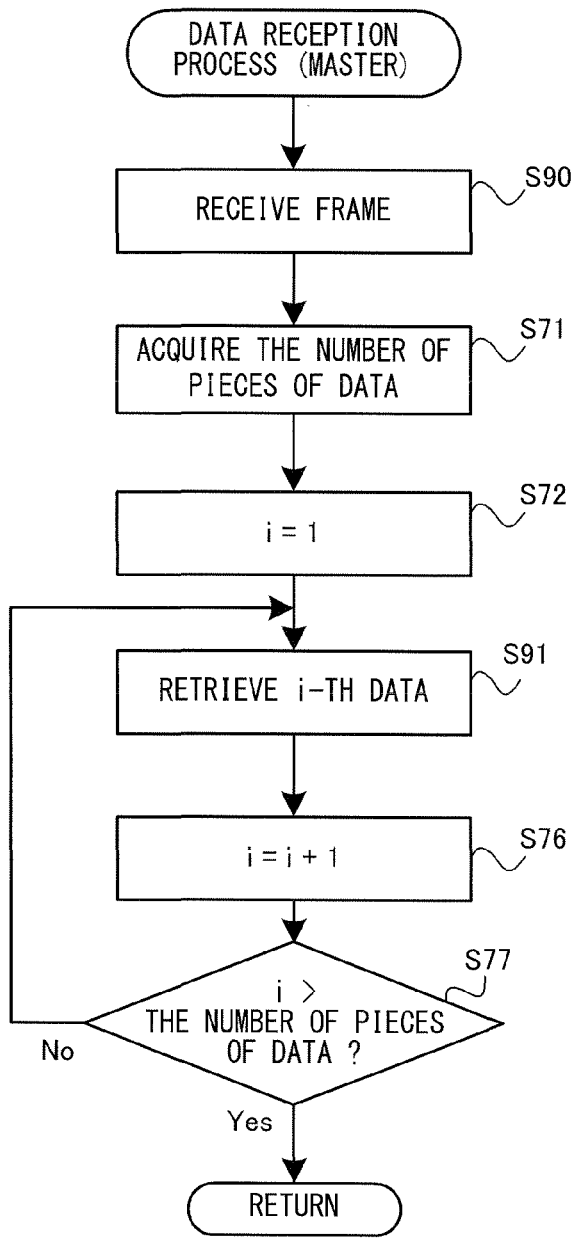
FIG. 21 is a flowchart illustrating details of a data reception process (master) performed in the master.

Next, details of the data reception process performed in the master will be described with reference to FIG. 21. FIG. 21 is a flowchart illustrating details of the data reception process (master) performed in the master. The same reference numerals are given to process steps in FIG. 21 that are the same as those in FIG. 19, and the description thereof is omitted.

First, the master performs a process of step S90. Specifically, the master receives a frame destined for the own apparatus, or a frame transmitted thereto in the broadcast fashion. More specifically, the master receives a frame which has a destination address matching the MAC address of the own apparatus (master). The master also receives a frame which has the broadcast address as the destination address and which includes information (the BSSID) matching the MAC address of the master. After the process of step S90, the master next executes processes of step S71 and step S72. After the process of step S72, the master executes a process of step S91.

In step S91, the master retrieves the i-th data. The master performs a process on the retrieved i-th data, the process depending on a destination indicated by the additional information of the retrieved data. For example, if the retrieved i-th data is data destined for the own apparatus, the master stores the i-th data in a memory. The i-th data stored in the memory is then used in the above-described game process (step S20). If the retrieved i-th data is data destined for other client, the master stores in the memory the data destined for the other client (the retrieved i-th data). In step S51 of the above-described data transmission process, the data destined for the other client is acquired, stored in the outbox 110 for individual, and transmitted to the other client. If the retrieved i-th data is data destined for all terminals, the master stores the data destined for all terminals (the retrieved i-th data) in the memory. In step S51 of the above-described data transmission process, the data destined for all terminals is acquired, stored in the outbox 120 for all, and transmitted to all terminals.

After the process of step S91, the master next executes processes of step S76 and step S77.

In this manner, in the master, all data included in the frame is separately retrieved and the separately retrieved data is used in the game process or transmitted to the client.

As described above, in the exemplary embodiment, the master and the client register each other and communicate with each other. In this manner, the game is progressed between the master and the client. Specifically, prior to the start of the game, the client transmits the connection request to the master to register the master in the own apparatus. The master receives the connection request, transmits a response to the connection request to the client, and registers the identification information (the MAC address) of the client in the own apparatus. In response to the reception of the response to the connection request, the client registers the identification information (the MAC address) of the master in the own apparatus. In this manner, the master and the client register each other. Meanwhile, the audience is not registered in the master and the audience unilaterally registers the master in the own apparatus. That is, the audience receives the beacon from the master without transmitting the connection request to the master, and registers, in the own apparatus, the identification information (the MAC address) of the master included in the beacon. The audience then receives data transmitted from the master and the client, and watches the game which is progressed between the master and the client as a spectator.

Since the audience is not registered in the master as described above, the master is not required to manage the audience. Thus, there is not limit of the number of audiences watching, as spectators, the game which is progressed between the master and the client. Even if a larger number of game apparatuses 10 participate in the game as audiences, the management load on the master does not increase. Because of this, for example, a large number of users can watch, as spectators, the game which is progressed with the participation of several numbers of people.

Also, in the exemplary embodiment, the client transmits data to other client via the master. Therefore, the client can still transmit data to the other client even if direct communication cannot be made between the clients due to a fact that a distance between the clients is large, or that there is an obstacle between the clients, hindering radio waves.

Also, in the exemplary embodiment, when the master (or client) acquires data having relatively a small size to be transmitted, the master (or client) does not instantly transmit the data, but temporarily accumulates the data in a memory. The master then transmits the accumulated plurality of pieces of data together in one frame. In this case, the master adds information regarding a source and destination to each of the plurality of pieces of data.

In this manner, the plurality of pieces of data having relatively small sizes is together transmitted in one frame, and thereby a speed at which the data is transmitted is faster than the case where each piece of data is separately transmitted. That is, since information such as a header is added to the frame in addition to the body of data to be transmitted, it is more efficient to transmit a plurality of pieces of data by including the plurality of pieces of data in one frame rather than transmitting a plurality of frames by including each piece of data in each frame. In the case where a game is progressed by a plurality of game apparatuses being wirelessly connected to one another as in the exemplary embodiment, data having relatively a small size is frequently exchanged between game apparatuses. In such a case, if each piece of data is included in each frame and transmitted, the data transmission/reception speed becomes slow, and which can be impediment to the progression of the game. In the exemplary embodiment, however, a plurality of pieces of data is transmitted in one frame. Thus, data can efficiently be transmitted/received.

(Modification)

In the above-described exemplary embodiment, the client and the audience register the MAC address of the master in the own apparatuses, and the master registers the MAC address of the client in the own apparatus. In another exemplary embodiment, any information may be registered if the information is identification information whereby each terminal can be identified.

Also, in the above-described exemplary embodiment, the master transmits a beacon, and the client, in response to the reception (a passive scanning) of the beacon, transmits a connection request to the master from which the beacon is transmitted, and thereby the master and the client connect to (register) each other. In another exemplary embodiment, the master and the client may connect each other by an active scanning. That is, the client may transmit a probe request to the master and the master, in response to the probe request, may transmit a probe response (a type of management frame) to the client. In response to the reception of the probe response from the master, the client may transmit the connection request to the master.

Also, in the above-described exemplary embodiment, the authentication between the master and the client is the open system authentication. In another exemplary embodiment, however, the master and the client may be authenticated by another authentication system.

Also, in the above-described exemplary embodiment, each game apparatus performs communication based on an IEEE 802.11 standard. In another exemplary embodiment, however, the communication may be performed based on any standard.

Also, in the above-described exemplary embodiment, the sequentially acquired data is sequentially stored in the outbox 110 for individual or the like. In another exemplary embodiment, however, each piece of data may not necessarily sequentially be acquired nor necessarily be stored in the outbox 110 for individual or the like. For example, when the application generates a plurality of pieces of data having different destinations at once, the generated plurality of pieces of data may not be stored in the outbox 110 for individual or the like, but a frame which includes the plurality of pieces of data and the destination information thereof may be generated and transmitted.

Also, in the above-described exemplary embodiment, if the acquired data cannot be stored in the outbox 110 for individual or the like, namely, if there is no available area in the outbox 110 for individual or the like, data already stored in the outbox 110 for individual or the like is transmitted. In addition, if a predetermine time has elapsed since data is stored in the outbox 110 for individual or the like, all stored data is transmitted. Furthermore, if the acquired data is data to instantly be transmitted, data already stored in the outbox 110 for individual or the like is transmitted together with the data to instantly be transmitted. In another exemplary embodiment, the stored data may be transmitted if predetermined criteria for transmitting the stored data, not limiting to the above-mentioned three criteria, are satisfied. For example, the stored data may automatically be transmitted at predetermined time intervals, or the stored data may be transmitted when the state of the game in each game apparatus 10 turns to a predetermined state.

Also, in the above-described exemplary embodiment, all data stored in the outbox 110 for individual or the like is transmitted in one frame. In another exemplary embodiment, instead of transmitting all data stored in the outbox 110 for individual or the like, at least two pieces of data stored in the outbox 110 for individual or the like may be transmitted in one frame. For example, data including the oldest data up to N-th oldest data may be transmitted in one frame.

Also, in the above-described exemplary embodiment, the master transmits data in the broadcast fashion. In another exemplary embodiment, however, data may be transmitted in a multicast fashion.

Also, in the above-described exemplary embodiment, each game apparatus performs wireless communication in assumption of the game apparatus being a hand-held game apparatus. In another exemplary embodiment, however, the game apparatus may be a battery-operated information processing apparatus, or an information processing apparatus which constantly receives power supply. Alternatively, the information processing apparatus may perform wired communication. In this case, information processing apparatuses are connected by a HUB or the like and perform data communication therebetween.

In another exemplary embodiment, a part or the entirety of the above-described processes may be performed by one or more dedicated circuits. Also, the above-described processes may be performed by a plurality of computers (such as the CPU 311 or processing units in the wireless communication module 36) included in the game apparatus 10.

Further, the above-described communication method may be applied to portable information processing apparatuses other than the game apparatus 10, such as PDAs (Personal Digital Assistant), advanced mobile phones having wireless LAN functionality, portable information processing apparatuses configured to be communicable with other devices by a unique communication method.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game processing system comprising a first gaming device, a second gaming device, and a third gaming device, wherein the first gaming device comprises:
a first network interface; and
at least one first processor configured to:
transmit a first information via the first network interface, the first information comprising at least a first information part and a second information part different from the first information part;
in response to receiving a second information from the second gaming device after transmitting the first information, execute an authentication process with the second gaming device, wherein a success or failure of the authentication process is determined based at least on the first information part; and
when the executed authentication process is a success, execute a communicative game based on communication, using the first network interface, with the second gaming device after said executing the authentication process with the second gaming device,
wherein the second gaming device comprises:
a second network interface; and
at least one second processor configured to:
in response to receiving the first information via the second network interface execute the authentication process to perform mutual authentication with the first gaming device; and
execute the communicative game based on communication, using the second network interface, with the first gaming device after said executing the authentication process with the first gaming device, and
wherein the third gaming device comprises:
a third network interface; and
at least one third processor configured to:
in response to receiving the first information via the third network interface and based on the second information part in the received first information, without performing the authentication process to perform mutual authentication with either the first gaming device or the second gaming device, receive, using the third network interface, data associated with the communicative game, currently being executed by the first and/or second gaming device, from at least one of the first gaming device and the second gaming device; and
when the second information part comprises a first value, execute a spectating experience process based on the received data, and
when the second information part comprises a second value different from the first value, stop the spectating experience process.

2. The game processing system according to claim 1, wherein the third gaming device further comprises a display screen, and wherein executing the spectating experience process includes displaying, on the display screen, a current state of the communicative game being executed by the first gaming device and the second gaming device.

3. The game processing system according to claim 2, wherein executing the spectating experience process further includes executing the communicative game on the third gaming device using the received data, and displaying one or more images representing a current state of the communicative game executed on the third gaming device on the display screen.

4. The game processing system according to claim 3, wherein the one or more images displayed on the display screen includes at least one image different from images currently displayed on display screens of the first gaming device and the second gaming device.

5. The game processing system according to claim 3, wherein the one or more images displayed on the display screen of the third gaming device includes at least one image depicting a game character controlled by a first user operating the first gaming device and another game character controlled by a second user operating the second gaming device.

6. The game processing system according to claim 5, wherein the first gaming device, the second gaming device, and the third gaming device are each configured to execute the communicative game based at least upon input provided by the first user and input provided by the second user.

7. The game processing system according to claim 1, wherein the at least one first processor is configured to register the second gaming device to communicate with the second device after the authentication process.

8. The game processing system according to claim 7, wherein the at least one second processor is configured to register the first gaming device to communicate with the first device after the authentication process.

9. The game processing system according to 7, wherein the at least first processor does not register the third gaming device.

10. The game processing system according to claim 7, wherein the at least one third processor unilaterally register at least the first gaming device and receives, using the third network interface, data associated with the communicative game from at least the first gaming device.

11. The game processing system according to claim 1, wherein the at least one first processor is further configured to:
transmit, using the first network interface, a management frame which includes first identification information identifying the first gaming device;
receive, using the first network interface, a registration frame including second identification information transmitted from the second gaming device; and
register the second gaming device as an inter-communication partner by storing, in a memory of the first gaming device, the received second identification information, and
wherein the at least one second processor is further configured to:
transmit, using the second network interface, the registration frame to the first gaming device in response to receiving of the management frame, wherein the registration frame includes the second identification information which identifies the second gaming device; and
register the first gaming device as an inter-communication partner by storing, in a memory of the second gaming device, the first identification information included in the management frame.

12. The game processing system according to claim 11, wherein the at least one third processor is further configured to unilaterally register the first gaming device by storing, in a memory of the third gaming device, the first identification information included in the management frame, without transmitting a registration frame for registering identification information of the third gaming device in the first gaming device.

13. The game processing system according to claim 12, wherein the first identification information stored in the third gaming device includes a MAC address of the first gaming device.

14. The game processing system according to claim 11, wherein
executability information indicating whether to permit the third gaming device to execute the communication game is included in the management frame transmitted by the first gaming device, and
the at least one third processor is further configured to determine, based on the executability information, whether to execute the communication game on the third gaming device.

15. The game processing system according to claim 1, wherein the received data received by the third gaming device is transmitted by at least one of the first gaming device or the second gaming device using broadcast or multicast transmission.

16. The game processing system according to claim 1, wherein the at least one third processor is further configured to:
receive management frames transmitted by a plurality of gaming devices; and
present, on the display screen, information regarding the plurality of gaming devices and enable a user to select one of the plurality of gaming devices as the first gaming device based upon the presented information.

17. The game processing system according to claim 1, wherein the first gaming device and the second gaming device exchange an authentication frame and an association frame between them and register each other, and wherein the third gaming device unilaterally registers, in a memory of the third gaming device, first identification information included in a management frame transmitted by the first gaming device, without exchanging an authentication frame or an association frame with the first gaming device.

18. The game processing system according to claim 1, wherein the at least one first processor is configured to alternate the first gaming device between an awake state and a power-saving state at predetermined time cycles, and to periodically transmit a management frame which includes information indicating the predetermined time cycles,
wherein the at least one second processor is configured to alternate the second gaming device between the awake state and the power-saving state in synchronization with the predetermined time cycles, based on the management frame transmitted by the first gaming device indicated by the first identification information registered in the second gaming device, and
wherein the at least one third processor is configured to alternate the third gaming device between the awake state and the power-saving state in synchronization with the predetermined time cycles, based on the management frame transmitted from the first gaming device indicated by the first identification information registered in the third gaming device.

19. The game processing system according to claim 1, wherein the at least one first processor is further configured to start the communicative game based upon at least one of a number of registered client gaming devices including the second gaming device, or a time interval since said registering of the second gaming device.

20. The game processing system according to claim 1, wherein the at least one second processor is further configured to provide, using the second network interface, user information associated with the second gaming device to the first gaming device, and wherein the first at least one processor is configured to perform said registering the second gaming device by performing a registration process at an application level by using the user information.

21. The game processing system according to claim 1, wherein the first information part in the first information includes a maximum number of participants allowed for the communicative game identified by a game identifier included in the first information and a current number of participants authenticated for the communicative game.

22. The game processing system according to claim 21, wherein the at least one first processor is configured to, in response to receiving the second information, determine, based on the maximum number of participants and the current number of participants, whether to perform the authentication process with the second gaming device.

23. The game processing system according to claim 1, wherein the at least one third processor is configured to, when the second information part indicates permission for spectating, unilaterally registering the first gaming device in a memory of the third gaming device, and when the second information part indicates a lack of permission for spectating, unilaterally deregistering the first gaming device from the memory of the third gaming device.

24. A spectating gaming device for spectating a communicative game currently being played between a first gaming device and a second gaming device which are each configured to, responsive to a first information transmitted by the first gaming device or to a second information transmitted by the second gaming device in response to receiving the first information, execute an authentication process to perform mutual authentication with the other, and to, after executing the authentication process, execute the communicative game based on communication with the other, wherein the first information comprises at least a first information part, and a second information part, and wherein the spectating gaming device comprises:
 a network interface; and
 at least one processor configured to:
  receive, using the network interface, data from at least one of the first gaming device and the second gaming device; and
  execute, using the received data, a spectating experience process for the communicative game currently being executed by the first gaming device and the second gaming device in communication with each other,
 wherein the at least one processor of the spectating gaming device is further configured to, in response to receiving the first information from the first gaming device and based on the second information part in the received first information, without performing the authentication process to perform mutual authentication with either of the first gaming device or the second gaming device, receive said data associated with the communicative game, currently being executed by the first and/or second gaming device, from at least one of the first gaming device or the second gaming device; and
 when the second information part comprises a first value, execute a spectating experience process based on the received data, and
 when the second information part comprises a second value different from the first value, stop the spectating experience process.

25. The spectating game device according to claim 24, wherein the spectating gaming device further comprises a display screen, and wherein said executing the spectating experience process includes displaying, on the display screen, a current state of the communicative game being executed by the first gaming device and the second gaming device.

26. A non-transitory computer readable storage medium storing program instructions that, when executed by at least one processor of a spectating gaming device for spectating a communicative game currently being played between a first gaming device and a second gaming device which are each configured to, responsive to a first information transmitted by the first gaming device or to a second information transmitted by the second gaming device in response to receiving the first information, execute an authenticate process to perform mutual authentication with the other, and to, and to after executing the authentication process, execute the communicative game based on communication with the other, causes the spectating gaming device to perform operations comprising:
 without performing, in response to receiving the first information from the first gaming device and based on at least one or a plurality of information parts in the received first information, the authentication process to perform mutual authentication with the first gaming device or the second gaming device, receive data associated with the communicative game, currently being executed by the first and/or second gaming device, from at least one of the first gaming device or the second gaming device; and
 when the second information part comprises a first value, execute the spectating experience process based on the received data, and
 when the second information part comprises a second value different from the first value, stop the spectating experience process.

27. The non-transitory computer readable storage medium according to claim 26, wherein executing the spectating experience process includes displaying, on a display screen controlled by the spectating gaming device, a current state of the communicative game being executed by the first gaming device and the second gaming device.

* * * * *